United States Patent
Takahashi

(10) Patent No.: US 11,614,905 B2
(45) Date of Patent: Mar. 28, 2023

(54) SERVER, INFORMATION PROCESSING SYSTEM, AND INFORMATION PROCESSING METHOD THAT TRANSMIT DATA OF ONE MORE PAGES OF AN ELECTRONIC FILE

(71) Applicant: Rina Takahashi, Kanagawa (JP)

(72) Inventor: Rina Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/465,858

(22) Filed: Sep. 3, 2021

(65) Prior Publication Data

US 2022/0075579 A1    Mar. 10, 2022

(30) Foreign Application Priority Data

Sep. 8, 2020  (JP) .............................. JP2020-150800

(51) Int. Cl.
*G06F 3/12* (2006.01)

(52) U.S. Cl.
CPC .......... *G06F 3/1238* (2013.01); *G06F 3/1208* (2013.01); *G06F 3/1222* (2013.01); *G06F 3/1258* (2013.01); *G06F 3/1287* (2013.01)

(58) Field of Classification Search
None
See application file for complete search history.

(56) References Cited

U.S. PATENT DOCUMENTS

| 2004/0027601 A1* | 2/2004 | Ito ........................... G06Q 10/10 358/1.15 |
| 2006/0072152 A1* | 4/2006 | Krykun ................... G06F 3/122 358/1.15 |
| 2011/0134471 A1* | 6/2011 | Kimura .................. G06F 3/1203 358/1.15 |
| 2015/0002894 A1* | 1/2015 | Adachi ................. G06F 3/1237 358/1.15 |
| 2019/0129669 A1 | 5/2019 | Takahashi et al. |
| 2020/0220988 A1 | 7/2020 | Takahashi |

FOREIGN PATENT DOCUMENTS

| JP | 8-058177 | 3/1996 |
| JP | 2007-301854 | 11/2007 |
| JP | 2014-002539 | 1/2014 |
| JP | 2016-197334 | 11/2016 |

\* cited by examiner

*Primary Examiner* — Thomas D Lee
(74) *Attorney, Agent, or Firm* — Xsensus LLP

(57) ABSTRACT

A server includes circuitry to: receive selection of particular file information from a list of file information; acquire a particular electronic file from a storage location indicated by the particular file information, the particular electronic file being one or more electronic files; extract data of one or more pages to be output from the particular electronic file according to the particular file information; and transmit the data of one or more pages of the particular electronic file to an output device to cause the output device to output the data of one or more pages of the particular electronic file.

18 Claims, 28 Drawing Sheets

FIG. 9

```
"entries": [
 {
  "entryId": "509832980816",
  "entryName": "Informatics, Class 1  ",
 }
 {
  "entryId": "509832980817",
  "entryName": "Informatics, Class 2  ",
 }
]
```

FIG. 10

```
"entries": [
 {
  "entryId": "509832980816",
  "entryName": "Programming Java",
 }
 {
  "entryId": "509832980817",
  "entryName": "Informatics",
 }
]
```

FIG. 13

```
Location: https://storage/Java Introduction.pdf
Page: 3-5

Location: https://storage/Java Advanced.pdf
Page: 12-16
```

FIG. 14

```
Title: Programming Java

Period: 2019/05/01-2019/05/07
Location: https://storage/Java Introduction.pdf
Page: 3-5
Location: https://storage/Java Advanced.pdf
Page: 12-16

Period: 2019/05/08-2019/05/14
Location: https://storage/Java Introduction.pdf
Page: 6-20
```

FIG. 15

```
Title: Programming Java

Id: 1
Period: 2019/05/01-2019/05/07
Location: htttps://storage/Java Introduction.pdf
Page: 3-5
Location: htttps://storage/Java Advanced.pdf
Page: 12-16

Id: 2
Period: 2019/05/08-2019/05/14
Location: htttps://storage/Java Introduction.pdf
Page: 6-20

Title: Economics

Id: 3
Period: 2019/05/02-2019/05/06
Location: htttps://storage/Economics Introductory.pdf
Page: 1
Location: htttps://storage/Economics.pdf
Page: 1-20

Id: 4
Period: 2019/05/07-2019/05/11
Location: htttps://storage/Economics Introductory.pdf
Page: 2-5
```

FIG. 16

```
"entries": [
{
  "Id": "1",
  "entryName": "Informatics",
}
{
  "Id": "2",
  "entryName": "Economics",
}
]
```

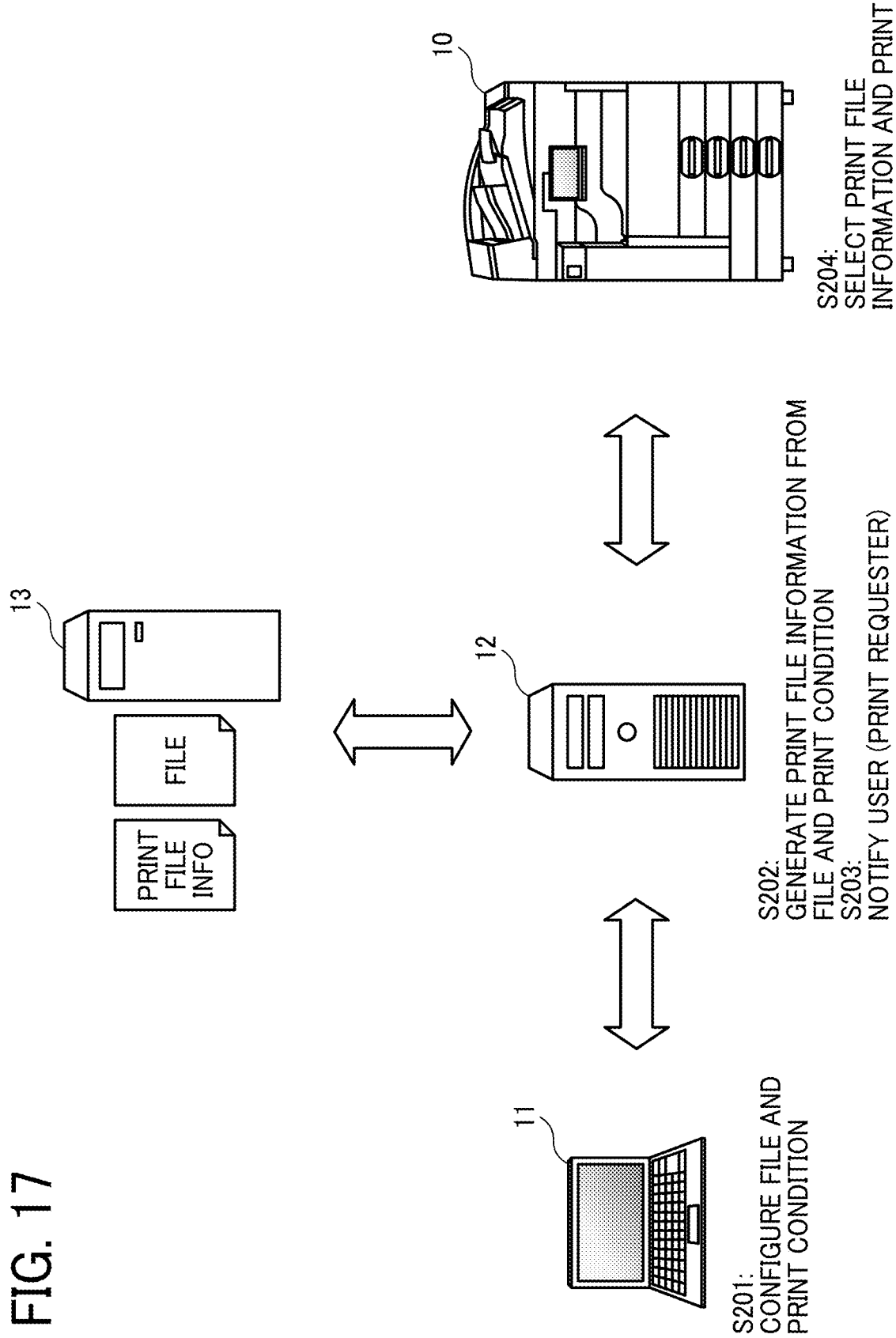

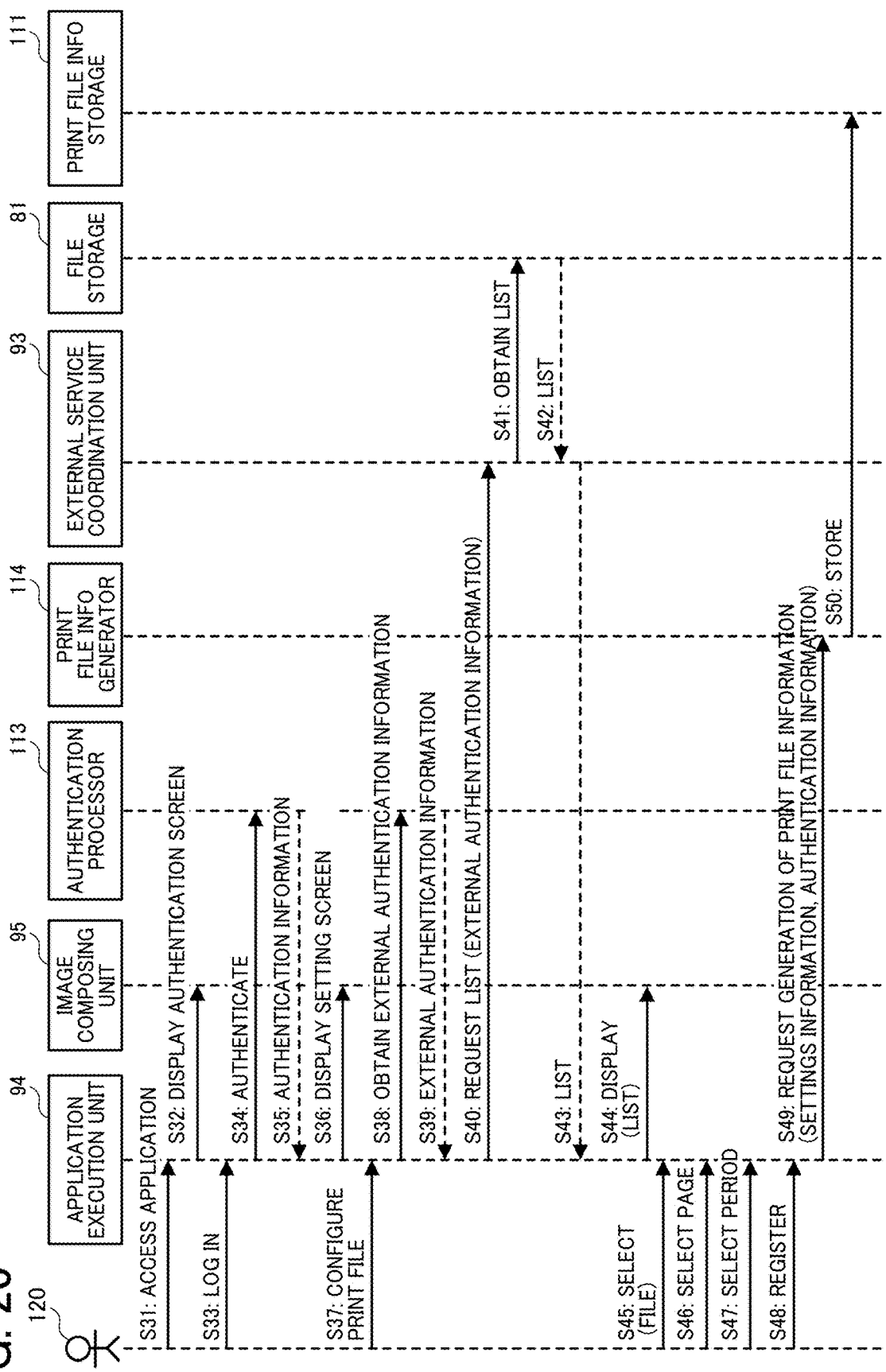

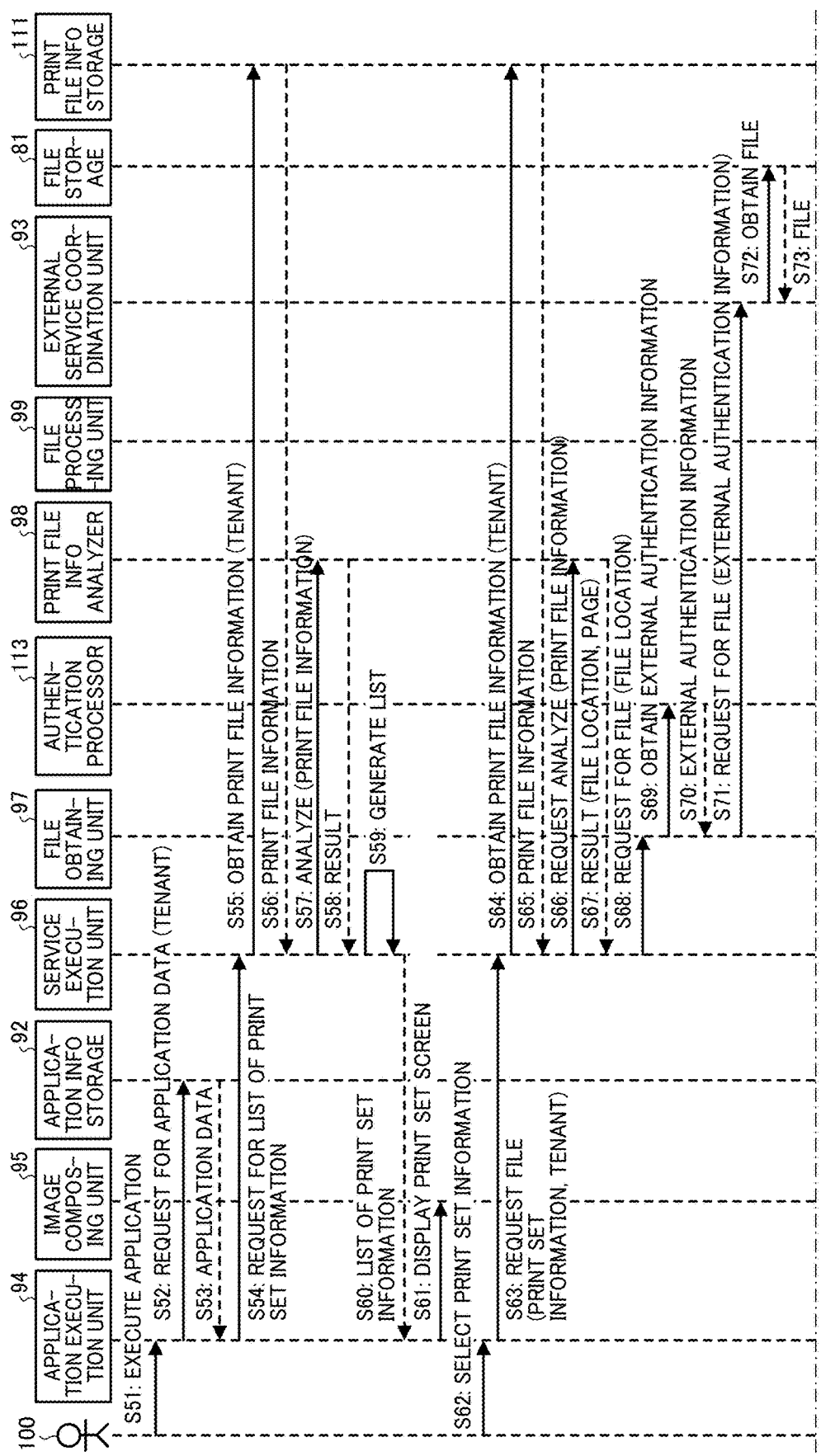

FIG. 23

```
Title: Class 1
Path: XX Department/Informatics
Location: https://storage/Java Introductory.pdf
Page: 3-5
ID: 1

Title: Class 2
Path: XX Department/Informatics
Location: https://storage/Java Advanced.pdf
Page: 12-16
ID: 2

Title: Class 1
Path: XX Department /Analysis
Location: https://storage/Basic Analysis.pdf
Page: 20-30
ID: 3
```

FIG. 24

```
Title: Informatics, Class 1
TeacherId: A
Location: https://storage/Java Introductory.pdf
Page: 3-5
ID: 1

Title: Informatics, Class 2
TeacherId: A
Location: https://storage/Java Advanced.pdf
Page: 12-16
ID: 2

Title: Analysis, Class 1
TeacherId: B
Location: https://storage/ Basic Analysis.pdf
Page: 20-30
ID: 3
```

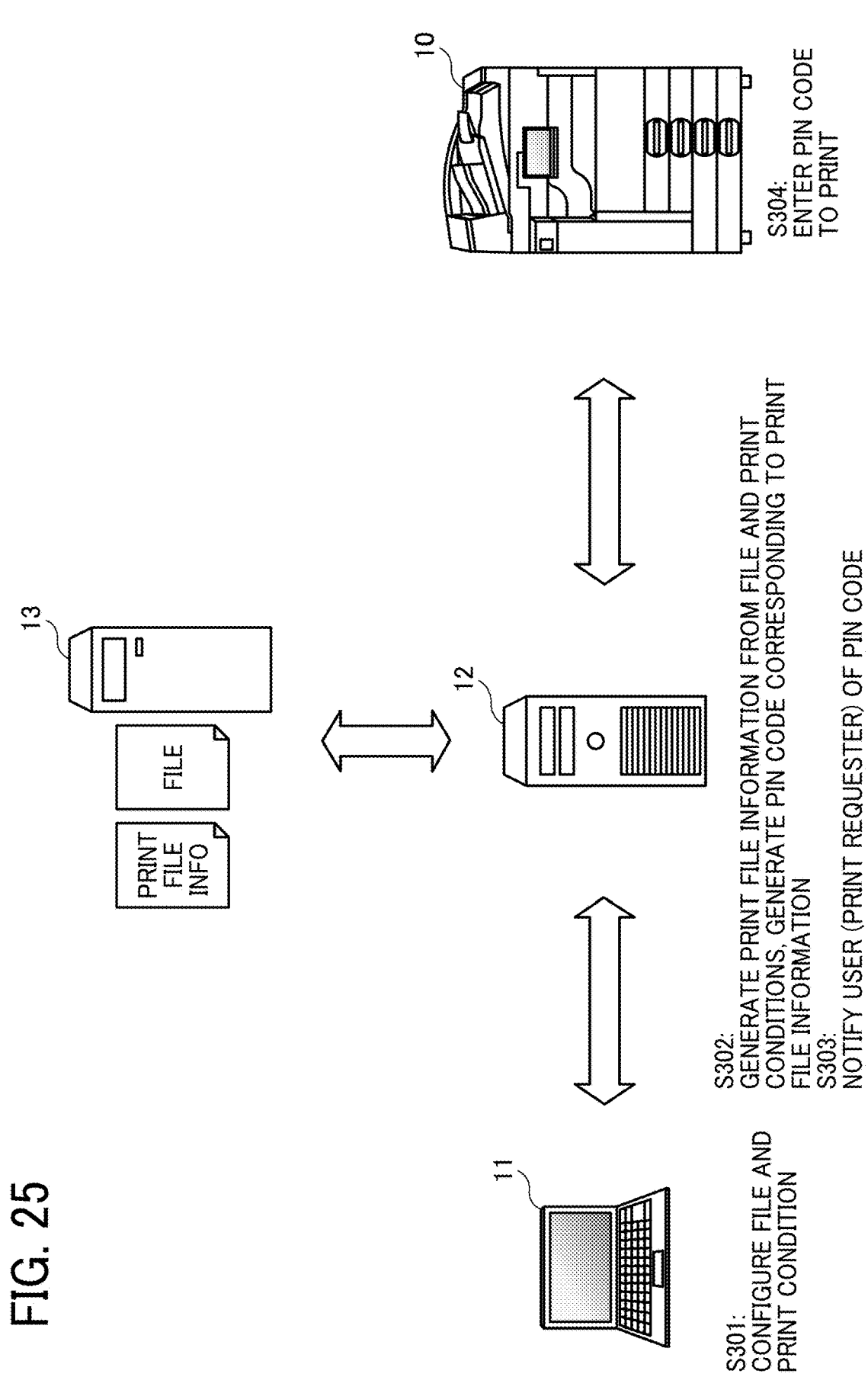

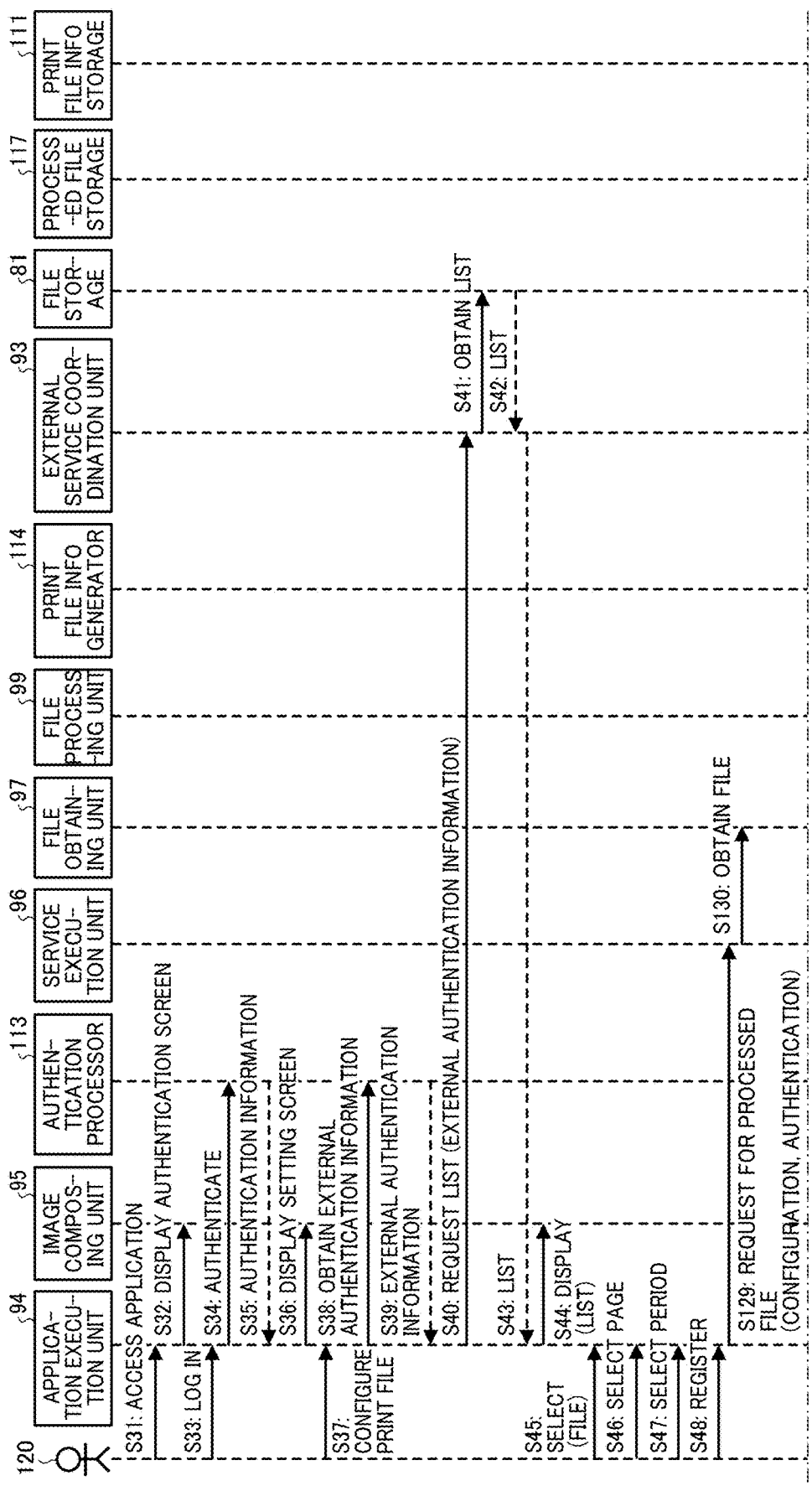

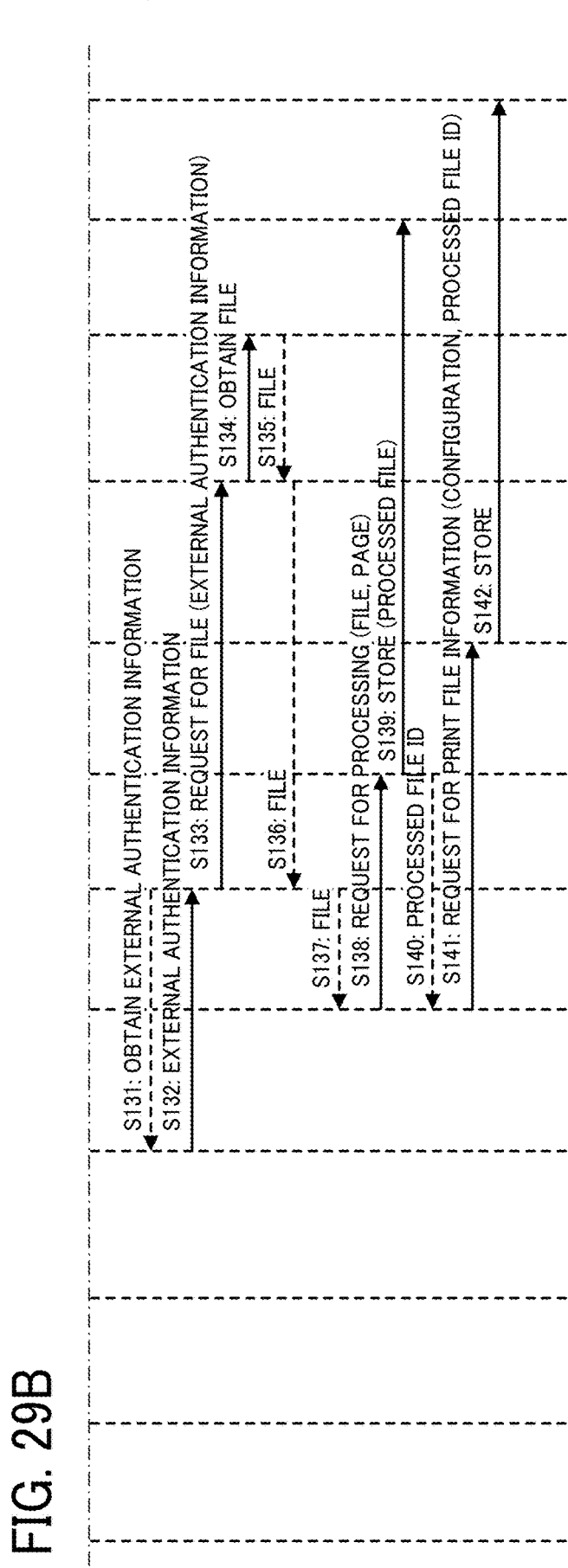

FIG. 30

```
Title: Informatics, Class 1
Period: 2019/05/01-2019/05/07
FileID: ["12345", "22222"]

Title: Informatics, Class 2
Period: 2019/05/08-2019/05/14
FileID: ["9999"]
```

SERVER, INFORMATION PROCESSING SYSTEM, AND INFORMATION PROCESSING METHOD THAT TRANSMIT DATA OF ONE MORE PAGES OF AN ELECTRONIC FILE

CROSS-REFERENCE TO RELATED APPLICATIONS

This patent application is based on and claims priority pursuant to 35 U.S.C. § 119(a) to Japanese Patent Application No. 2020-150800, filed on Sep. 8, 2020, in the Japan Patent Office, the entire disclosure of which is hereby incorporated by reference herein.

BACKGROUND

Technical Field

The present invention relates to a server, an information processing system, and an information processing method.

Related Art

A device such as an image forming apparatus may operate in cooperation with a service providing server to perform processing. For example, the service providing server acquires an electronic file from a specific storage location such as an external storage area, transmits the acquired file to the image forming apparatus, and instructs the image forming apparatus to print data of the acquired file. When the file to be printed contains a plurality of pages, the user may instruct to print only designated pages. Designation of pages to be printed has been, however, cumbersome.

SUMMARY

Example embodiments include a server including circuitry configured to: receive selection of particular file information from a list of file information; acquire a particular electronic file from a storage location indicated by the particular file information, the particular electronic file being one or more electronic files; extract data of one or more pages to be output from the particular electronic file according to the particular file information; and transmit the data of one or more pages of the particular electronic file to an output device to cause the output device to output the data of one or more pages of the particular electronic file.

Example embodiments include an information processing system including the above-described server, and the output device.

Example embodiments include a server including a memory that stores a plurality of processed electronic files, each processed electronic file having been generated from an electronic file to be output according to information on an output condition of the electronic file to be output; and circuitry configured to receive selection of particular file information from a list of file information, acquire a particular processed electronic file from a storage location of the memory, the storage location being indicated by the particular file information, and transmit the particular processed electronic file to an output device to cause the output device to output data of the particular processed electronic file.

Example embodiments include an information processing system including the above-described server, and the output device.

Example embodiments include a method for processing information, including: receiving selection of particular file information from a list of file information; acquiring a particular electronic file from a storage location indicated by the particular file information, the particular electronic file being one or more electronic files; extracting data of one or more pages to be output from the particular electronic file according to the particular file information; and transmitting the data of one or more pages of the particular electronic file to an output device to cause the output device to output the data of one or more pages of the particular electronic file.

Example embodiments include a non-transitory recording medium storing a plurality of instructions which, when executed by one or more processors, cause the processors to perform the above-described method.

Example embodiments include a method for processing information, including: storing, in a memory, a plurality of processed electronic files, each processed electronic file having been generated from an electronic file to be output according to information on an output condition of the electronic file to be output; receiving selection of particular file information from a list of file information; acquiring a particular processed electronic file from a storage location of the memory, the storage location being indicated by the particular file information; and transmitting the particular processed electronic file to an output device to cause the output device to output data of the particular processed electronic file.

Example embodiments include a non-transitory recording medium storing a plurality of instructions which, when executed by one or more processors, cause the processors to perform the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

FIG. 9 is an illustration of an example data structure of a list of print file information;

FIG. 10 is an illustration of another example data structure of a list of print file information;

FIG. 13 is an illustration of another example data structure of print file information;

FIG. 14 is an illustration of another example data structure of print file information;

FIG. 15 is an illustration of another example data structure of print file information;

FIG. 16 is an illustration of another example data structure of a list of print file information;

FIG. 17 is a schematic diagram for explaining a concept of processing performed by the information processing system of FIG. 1 according to exemplary embodiments;

FIG. 20 is a sequence diagram illustrating processing to register print file information, performed by the information processing system of FIG. 18, according to an exemplary embodiment;

FIGS. 21A and 21B (FIG. 21) are a sequence diagram illustrating processing to execute printing, performed by the information processing system of FIG. 18, according to an exemplary embodiment;

FIG. 23 is an illustration of another example data structure of print file information in a hierarchical structure;

FIG. 24 is an illustration of another example data structure of print file information in a hierarchical structure.

FIG. 25 is a schematic diagram for explaining a concept of processing performed by the information processing system of FIG. 1 according to exemplary embodiments;

FIGS. 29A and 29B (FIG. 29) are a sequence diagram illustrating processing to register print file information in the example case of processing the file in advance, performed by the information processing system of FIG. 28, according to the exemplary embodiment;

FIG. 30 is an illustration of another example data structure of a list of print file information.

DETAILED DESCRIPTION

Figure 1:
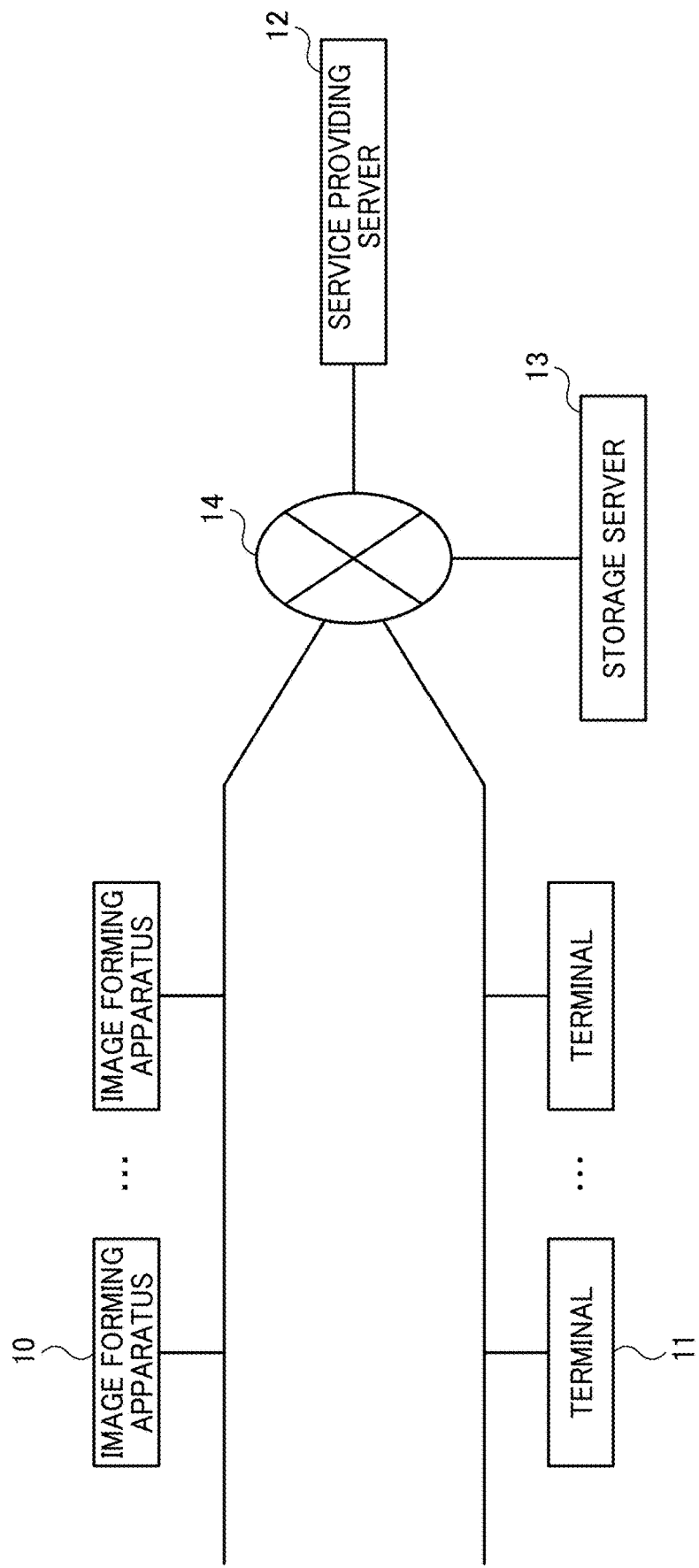
FIG. 1 is a schematic diagram illustrating an example configuration of an information processing system, according to an exemplary embodiment.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a schematic diagram illustrating an example configuration of an information processing system, according to exemplary embodiments. The information processing system of FIG. 1 includes one or more image forming apparatuses 10 each being an example of a device, one or more terminals 11 each operated by a user, a service providing server 12, and an external storage server (storage server) 13. The image forming apparatus 10, the terminal 11, the service providing server 12, and the external storage server 13 are connected to a network 14 such as the Internet, to communicate with each other via the network 14.

Although the device is described as the image forming apparatus 10 such as a multifunctional printer (MFP) in this embodiment, any device having a communication function other than the image forming apparatus 10 may be used as the device. Examples of such device include a projector (PJ), an interactive white board (IWB, electronic whiteboard with mutual communication capability), an industrial machine, an imaging device, a sound collecting device, a medical device, a network home appliance, an automobile such as a connected car, a notebook personal computer (PC), a mobile phone, a smartphone, a tablet terminal, a game machine, a personal digital assistant (PDA), a wearable PC, and a desktop PC. For example, some of the above-described example devices may be referred to as an output device that outputs data of an electronic file, which may be processed by the service providing server 12, according to various settings input via the terminal 11.

The image forming apparatus 10 is a device that performs image formation and provided with a plurality of functions such as a scan function, a copy function, a print function, a fax transmission function, and a communication function. The image forming apparatus 10 includes an operation unit that receives an input from a user and displays various information such as a processing status or an error, and an image forming unit that implements one or more functions related to image formation. The image forming apparatus accesses the service providing server 12 via the network 14 and provides various services to the user in cooperation with the service providing server 12.

The terminal 11 may be implemented by a personal computer (PC), a smartphone, a tablet terminal, or the like, to be operated by a user. For example, the terminal 11 is used by the user such as a system administrator, and according to an instruction from the user, inputs an electronic file of an image to be printed, and sets printing conditions to be used when printing the image of the file. In this disclosure, an electronic file may be referred to as a file, and includes various types of document and image. The printing conditions are various settings to indicate which part of which file stored in which storage location is to be printed.

The printing conditions also include settings to indicate monochrome printing or color printing, multiple-page printing (printing multiple pages per sheet) or single-page printing, single-sided printing or duplex printing, and the number of pages to be printed.

The service providing server 12 is implemented by an information processing apparatus such as a server, and provides various services. The external storage server 13 provides a storage area as a cloud service. Examples of services provided by the service providing server 12 include a service that enables storing and reading of electronic files in a storage area of the external storage server 13, and a service that enables distribution of data to a specific distribution destination. These processes (services) are merely examples, such that the service providing server 12 may provide services other than the above-described services. As the storage area, the service providing server 12 may provide a storage area in the service providing server 12. In such case, the external storage server 13 may not be provided.

According to an instruction from the user such as the system administrator, the terminal 11 inputs an electronic file to be printed and sets printing conditions to be used for printing data of the electronic file. The terminal 11 transmits the electronic file that is input and the printing conditions to the service providing server 12 via the network 14. The service providing server 12 then stores the received electronic file in the external storage server 13 in association with the printing conditions.

The service providing server 12 generates print file information, as information on the electronic file, based on the electronic file and the printing conditions, and sends the print file information to a user who uses the service provided by the service providing server 12. The user who uses the service is a user who wants to print data of the electronic file, and operates the image forming apparatus 10 to receive the service. The user who instructs printing may be the same with or different from the user who inputs the electronic file. The user who wants to print data of the electronic file receives the notification on the print file information at the image forming apparatus 10. Specifically, the user selects the print file information and instructs the image forming apparatus 10 to perform printing of data of the electronic file, corresponding to the selected print file information, to obtain a printed image. In this case, the user may instruct the image forming apparatus 10 to only print a desired portion of the data of the electronic file.

Figure 2:
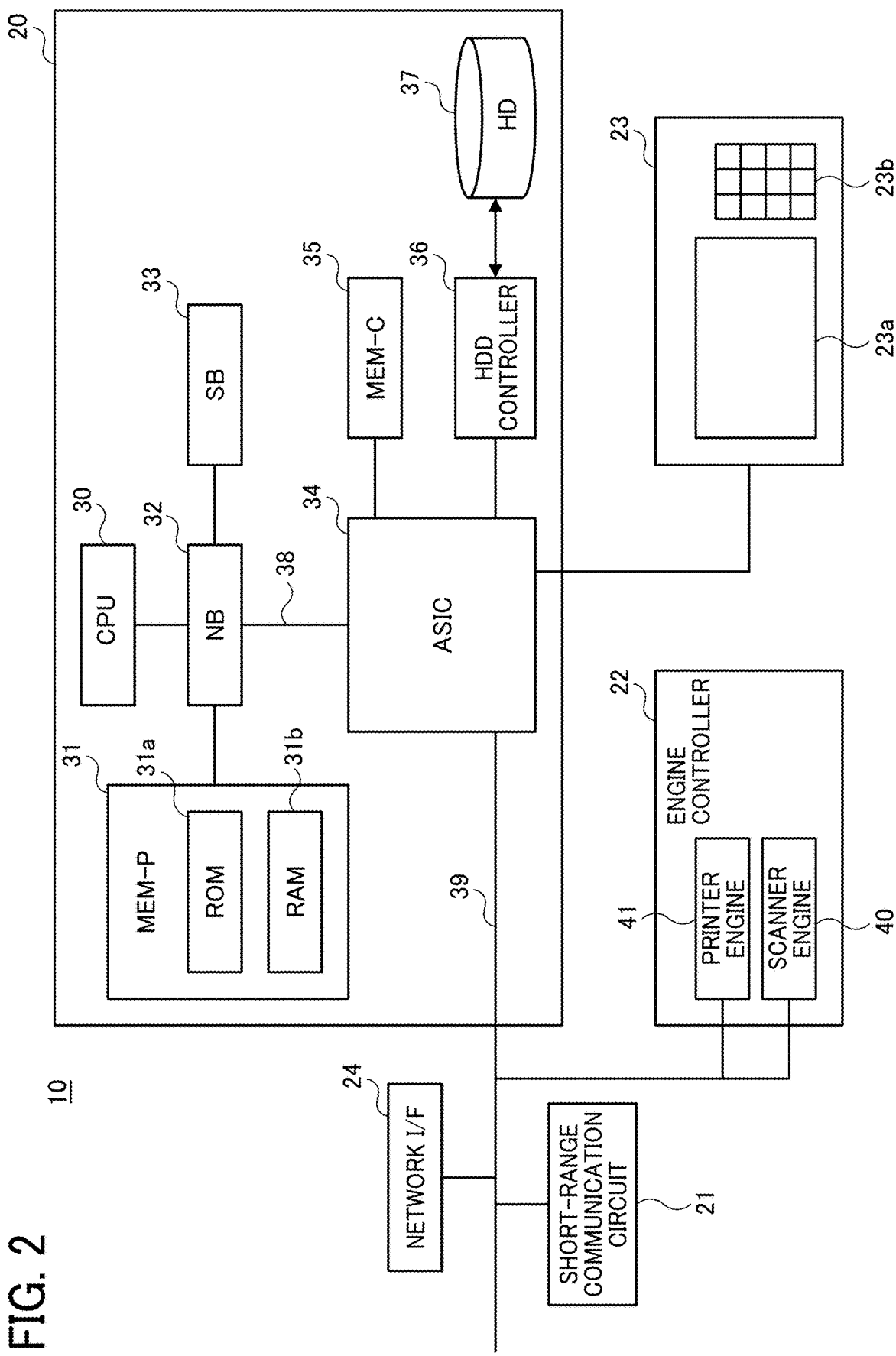
FIG. 2 is a block diagram illustrating an example of a hardware configuration of an image forming apparatus, according to an exemplary embodiment.

FIG. 2 is a diagram illustrating an example of a hardware configuration of the image forming apparatus 10 in the information processing system of FIG. 1. In this embodiment, the image forming apparatus 10 is implemented as an MFP. The MFP includes a controller 20, a short-range communication circuit 21, an engine controller 22, a control panel 23, and a network interface (I/F) 24.

The controller 20 includes a central processing unit (CPU) 30 as a main processor, a system memory (MEM-P) 31, a northbridge (NB) 32, a southbridge (SB) 33, an Application Specific Integrated Circuit (ASIC) 34, a local memory (MEM-C) 35, a hard disk drive (HDD) controller 36, and a hard disk (HD) 37. The NB 32 and the ASIC 34 are connected by an Accelerated Graphics Port (AGP) bus 38.

The CPU 30 controls entire operation of the MFP. The NB 32 is a bridge for connecting the CPU 30, the MEM-P 31, the SB 33, and the AGP bus 38, and includes a memory controller for controlling reading from and writing to the MEM-P 31, a peripheral component interconnect (PCI) master, and an AGP target.

The MEM-P 31 includes a ROM 31a, which is a memory for storing programs and data for implementing various functions of the controller 20, and a RAM 31b used as a storage area for deploying programs or data or a storage area for rendering print data. The programs stored in the RAM 31b may be stored in a file in a format installable or executable on a computer-readable recording medium such as a CD-ROM, a CD-R, or a DVD for distribution.

The SB 33 is a bridge for connecting the NB 32 to PCI devices and peripheral devices. The ASIC 34 is hardware, such as an integrated circuit, dedicated to image processing, and serves as a bridge that connects the AGP bus 38, the PCI bus 39, the HDD controller 36, and the MEM-C 35. The ASIC 34 includes a PCI target and an AGP master, an arbiter (ARB) serving as a core of the ASIC 34, a memory controller that controls the MEM-C 35, and a plurality of direct memory access controllers (DMACs) that rotates coordinates of image data by a hardware logic. The ASIC 34 includes a PCI unit that transfers data to and from the scanner engine 40 and the printer engine 41 via the PCI bus 39. The ASIC 34 may be connected to a universal serial bus (USB) interface, or the Institute of Electrical and Electronics Engineers 1394 (IEEE1394) interface.

The MEM-C 35 is a local memory used as a buffer for an image to be copied or a buffer for coding. The HD 37 is a storage for storing image data, font data used in printing, and forms. The HDD controller 36 controls reading or writing of various data from or to the HD 37 under control of the CPU 30. The AGP bus 38 is a bus interface for a graphics accelerator card, which has been proposed to accelerate graphics processing. Through directly accessing the MEM-P 31 by high-throughput, processing speed of the graphics accelerator card is improved.

The short-range communication circuit 21 is a communication circuit that communicates in compliance with the near field communication (NFC), the BLUETOOTH, and the like.

The engine controller 22 includes a scanner engine 40 and a printer engine 41. The control panel 23 includes a panel display 23a and an operation panel 23b. The panel display 23a is implemented by, for example, a touch panel that displays current settings or a selection screen to receive a user input. The operation panel 23b includes a numeric keypad that receives set values of various image forming parameters such as image density parameter and a start key that receives an instruction for starting copying.

The controller 20 controls drawing, communication, or user inputs to the control panel 23, for example. The scanner engine 40 and the printer engine 41 each performs various image processing, such as error diffusion or gamma conversion.

In response to an instruction to select a specific application through the control panel 23, for example, using a mode switch key, the MFP selectively performs a document box function, a copier function, a printer function, and a facsimile function. According to the mode switch key, the MFP operates in a document box mode, a copier mode, a printer mode, and a facsimile mode, to perform corresponding function.

The network I/F 24 is an interface for performing data communication using the network 14. The short-range communication circuit 21 and the network I/F 24 are electrically connected to the ASIC 34 via the PCI bus 39.

Figure 3:
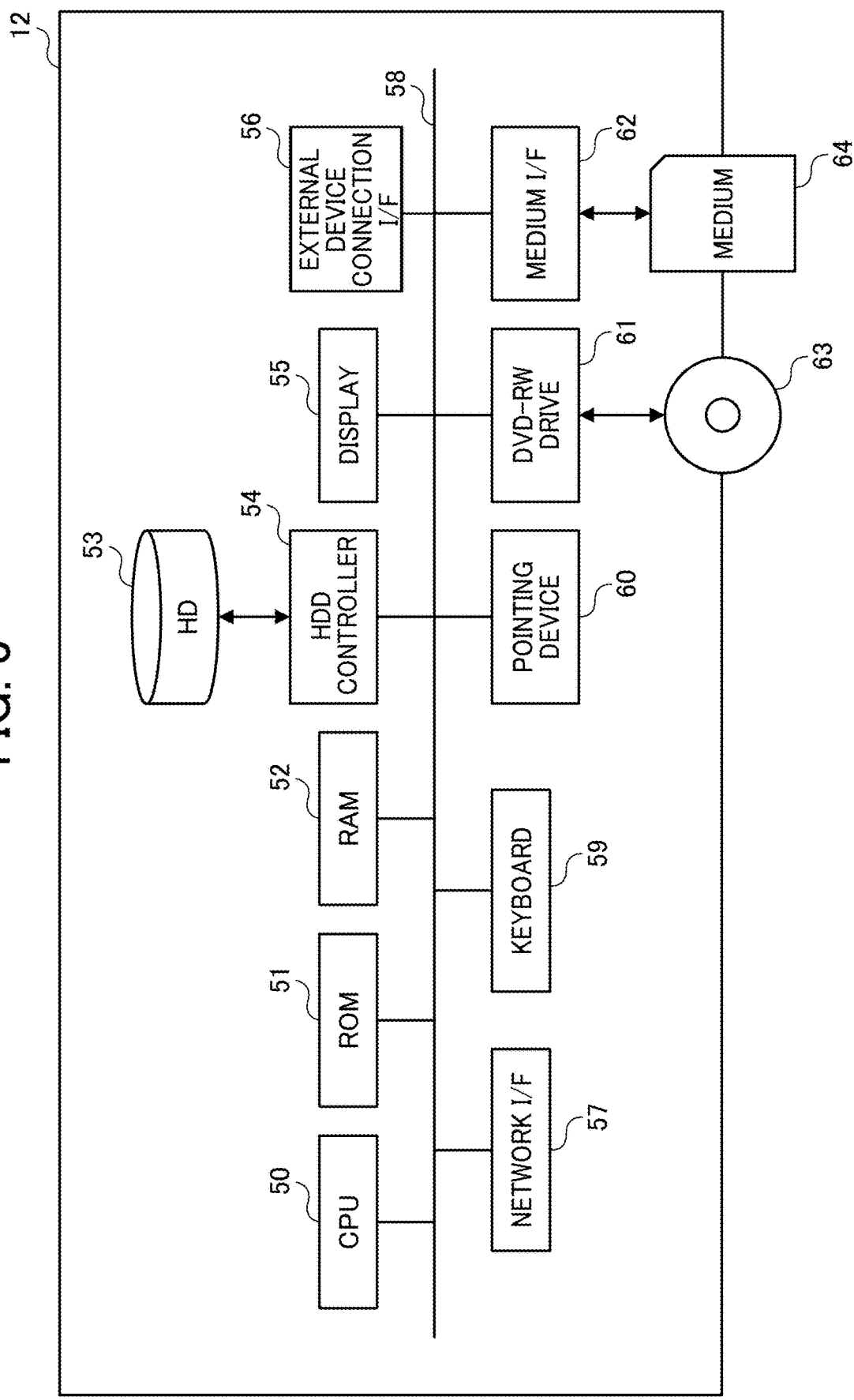
FIG. 3 is a block diagram illustrating an example of a hardware configuration of a service providing server, according to an exemplary embodiment.

FIG. 3 is a block diagram illustrating an example of a hardware configuration of the service providing server 12, according to the embodiment. The terminal 11 and the external storage server 13 may also have the same hardware configuration as the service providing server 12.

The service providing server 12 is a general computer, and includes a CPU 50, a ROM 51, a RAM 52, a HD 53, an HDD controller 54, a display 55, an external device connection I/F 56, a network I/F 57, a data bus 58, a keyboard 59, a pointing device 60, a DVD-RW (Digital Versatile Disk Rewritable) drive 61, and a medium I/F 62.

The CPU 50 controls entire operation of the service providing server 12. The ROM 51 stores programs such as an initial program loader (IPL) to boot the CPU 50. The RAM 52 provides a work area for the CPU 50. The HD 53 stores various data such as a control program. The HDD controller 54 controls reading and writing of various data from and to the HD 53 under control of the CPU 50. The display 55 displays various information such as a cursor, menu, window, characters, or image.

The external device connection I/F 56 is an interface for connecting to various external devices. Examples of the external devices include, but are not limited to, a USB memory and a printer. The network I/F 57 is an interface for performing data communication using the network 14. Examples of the data bus 58 include, but not limited to, an address bus and a data bus, which electrically connects the components such as the CPU 50 with one another.

The keyboard 59 is one example of an input device provided with a plurality of keys for enabling a user to input characters, numerals, or various instructions. The pointing device 60 is an example of an input device that allows a user to select or execute a specific instruction, select a target for processing, or move a cursor being displayed. The DVD-RW drive 61, which is an example of a removable recording medium, controls reading and writing of various types of data from and to the DVD-RW 63. While the DVD-RW 63 has been described as an example, any other recording medium such as a DVD-R may be used. The medium I/F 62 controls reading or writing of data from or to a recording medium 64 such as a flash memory.

In the information processing system of this embodiment, the external storage server 13 is used as a storage area for storing electronic files, but the HD 53 of the service providing server 12 may be used as a storage area.

For the descriptive purposes, general printing service is briefly described. To request file printing service, the user selects a file to be printed and designates a page to be printed, and instructs printing of the designated page of the selected file.

Figure 4:
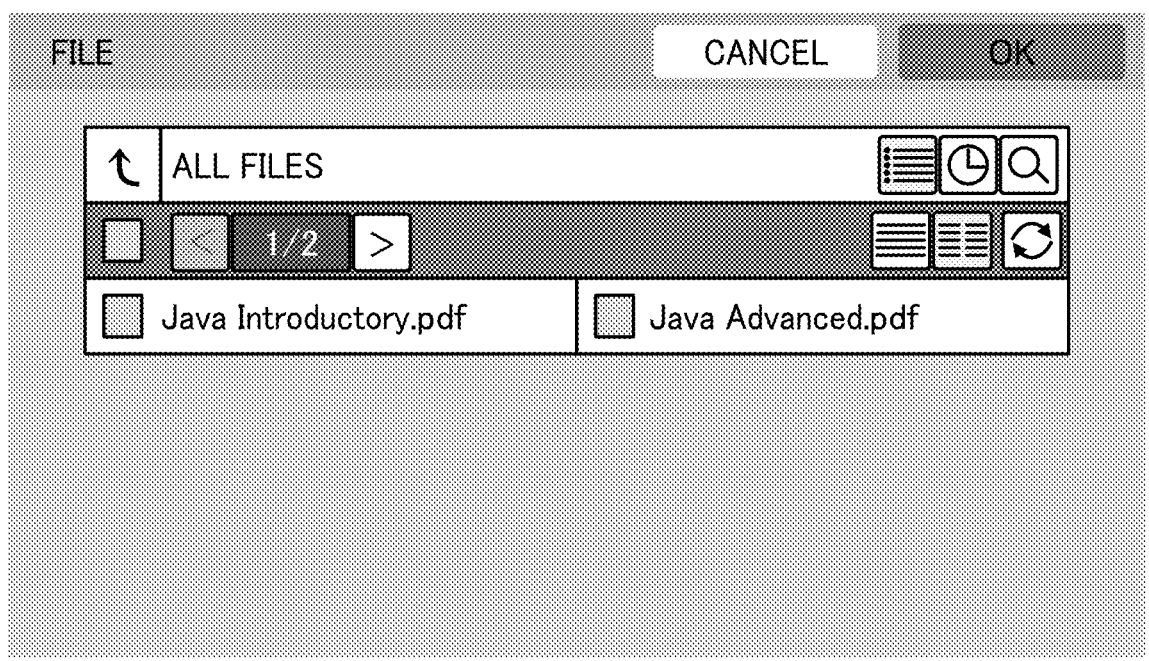
FIG. 4 illustrates an example file selection screen, according to a comparative example.

FIG. 4 illustrates an example file selection screen. In response to a user input of a user ID and a password, authentication is performed. After successful authentication, the image forming apparatus displays on the control panel a list of files that can be printed by the log-in user. The file selection screen of FIG. 4 displays a list of files. In FIG. 4, two files are displayed so as to be selectable by the user. The user may select any file to instruct printing of data of the selected file.

Figure 5:
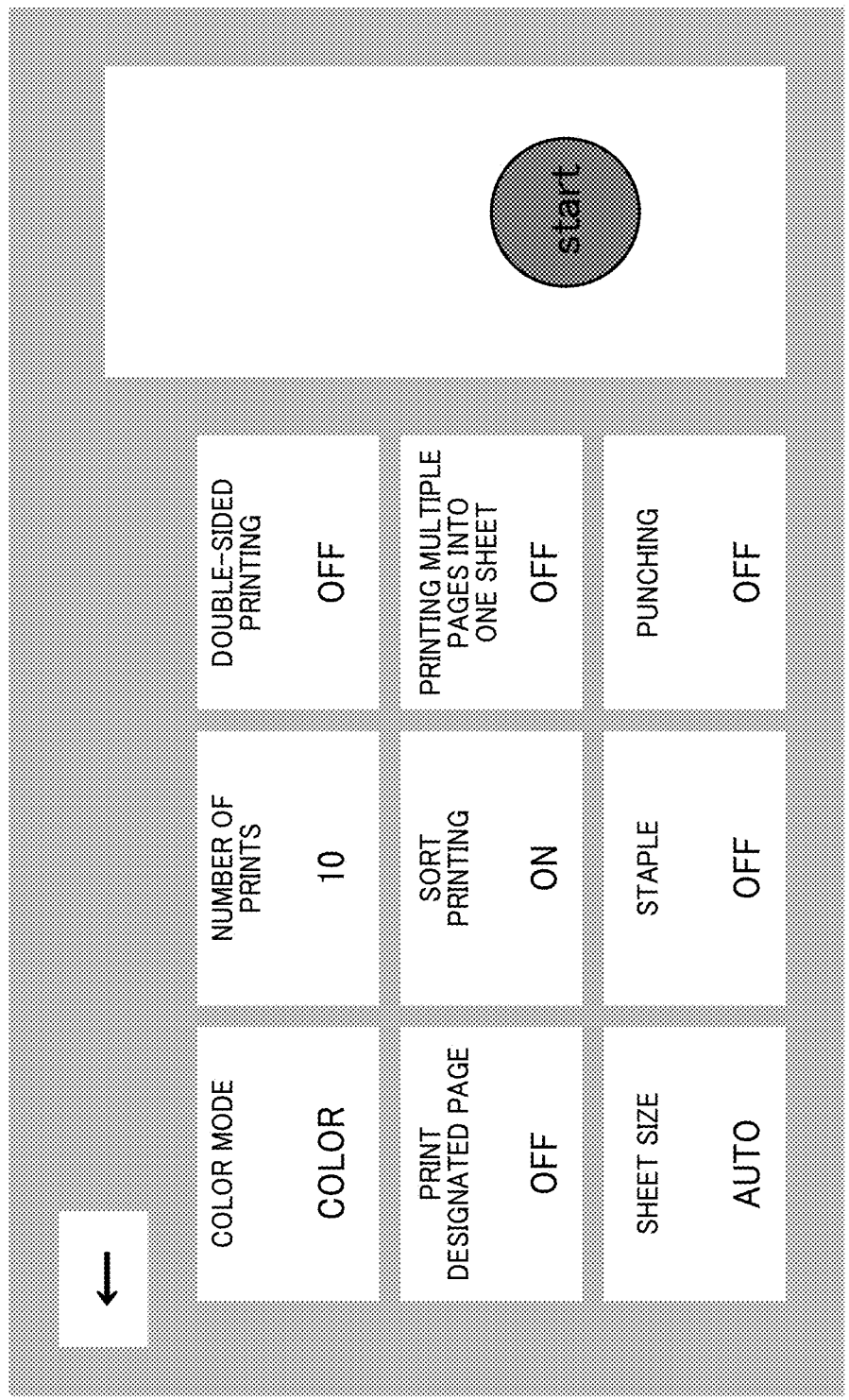
FIG. 5 illustrates an example print setting screen, according to the comparative example.

FIG. 5 illustrates an example print setting screen. In response to selection of a file on the file selection screen illustrated in FIG. 4, the image forming apparatus displays the print setting screen illustrated in FIG. 5. On the print setting screen, the user selects a page to be printed, and various settings such as monochrome/color, the number of sheets to be printed, a paper size, etc., and presses a start button to instruct printing according to print settings that are selected.

In case a plurality of files is printed, but pages to be printed are different from each other in each file, the user has to display the file selection screen illustrated in FIG. 4 to select a file and display the print setting screen illustrated in FIG. 5 to designate a page each time a file is selected. This requires the user to perform this operation multiple times and remember the page(s) that the user wants to print for each file.

Figure 6:
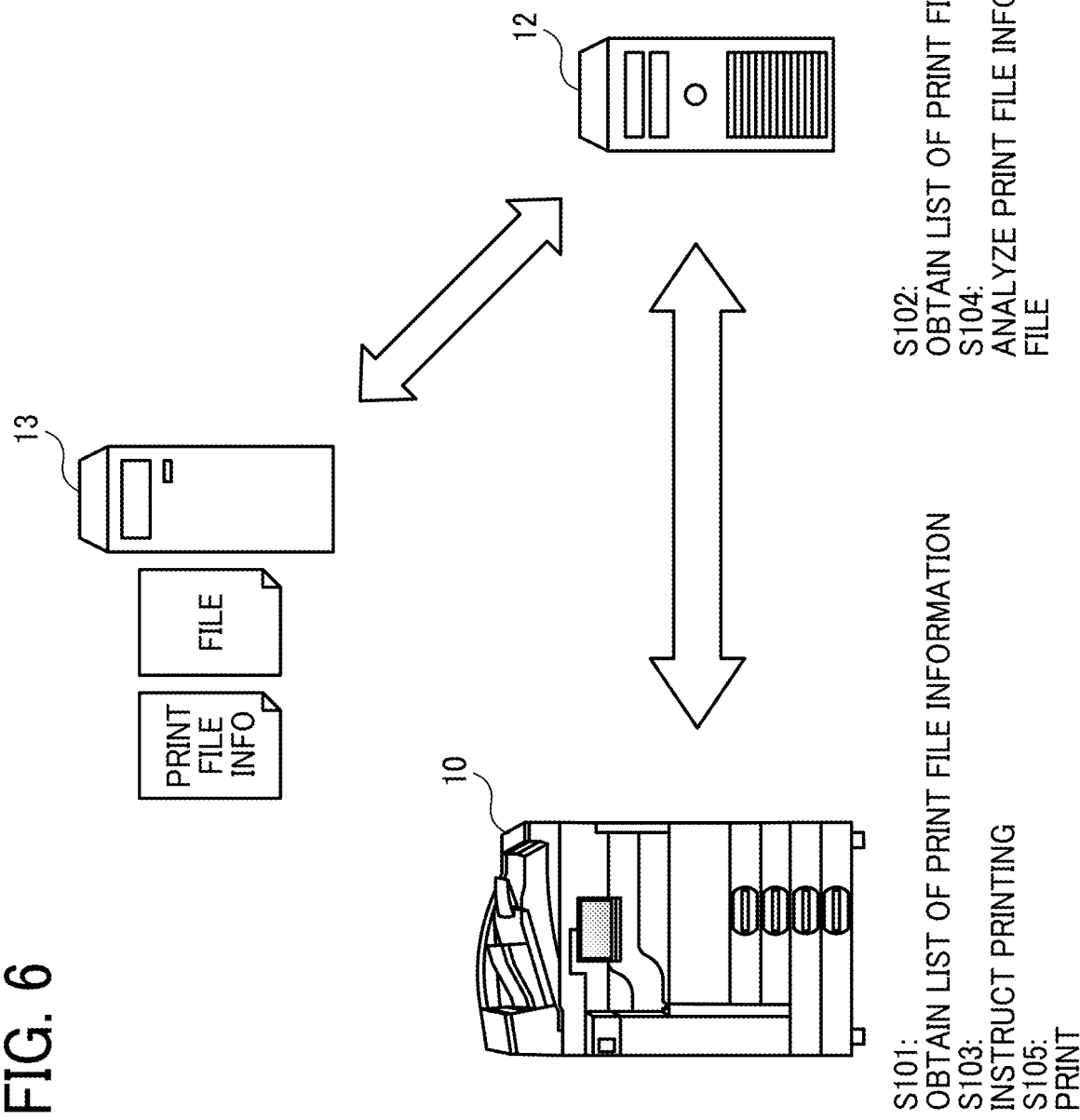
FIG. 6 is a schematic diagram for explaining a concept of processing performed by the information processing system of FIG. 1 according to exemplary embodiments.

FIG. 6 is a schematic diagram for explaining a concept of processing performed by the information processing system of FIG. 1 according to embodiments. The information processing system of FIG. 1 is configured to allow the user to select print file information instead of allowing the user to select a file to be printed. The print file information includes information on a page to be printed in addition to a file to be printed. Thus, the user simply selects the print file information to instruct printing of a desired page in a desired file. That is, the user does not have to remember which page to print for each file, or performs the above-described processing.

Further, in the processing described above referring to FIGS. 4 and 5, an electronic file subjected to printing is transmitted to the image forming apparatus, and the image forming apparatus prints one or more pages of the electronic file designated by a user. In contrary, in the information processing system of FIG. 6, only a designated page(s) of an electronic file subjected to printing is transmitted to the image forming apparatus 10. This can reduce the amount of data to be transmitted via the network 14, thus reducing communication load and time for downloading the electronic file to the image forming apparatus 10.

Referring to FIG. 6, example operation performed by the information processing system is described. For simplicity, in some figures, print file information is indicated as "print file info". Further, while the print file information may be configured to indicate one or more electronic files to be subject to printing, one or more electronic files may be simply referred to as an electronic file or a file. Similarly, while one or more pages may be designated as a target for printing, the page or pages to be designated may be simply referred to as a page. That is, one item of print file information may indicate one or more electronic files to be printed, and one or more pages to be printed.

Still referring to FIG. 6, the user moves to a place where the image forming apparatus is installed, operates the control panel 23, and instructs the image forming apparatus 10 to execute processing of acquiring a list of print file information (S101). In executing this processing, the image forming apparatus 10 requests the service providing server 12 to acquire a list of print file information and transmit the acquired list to the image forming apparatus 10.

In response to a request for acquiring a list of print file information, the service providing server 12 acquires the list of print file information, which may be stored in the external storage server 13 (S102). The service providing server 12 transmits the list of print file information to the image forming apparatus 10.

The user selects particular print file information from the list of print file information displayed on the control panel 23 of the image forming apparatus 10, and instructs to start print processing (S103). The image forming apparatus 10 transmits the particular print file information, which is selected, to the service providing server 12 via the network 14.

The service providing server 12 acquires the particular print file information in response to selection at the image forming apparatus 10 and analyzes the acquired print file information (S104). Specifically, through analysis, the service providing server 12 acquires information on a file to be printed and information on a storage location of such file, from the print file information. The service providing server 12 acquires the file to be printed from the external storage server 13 that stores electronic files, using the acquired information. The service providing server 12 further processes the acquired file according to information on a page to be printed, which is included in the print file information, to generate a file containing only the designated page, and transmits the generated file to the image forming apparatus 10.

The image forming apparatus 10 acquires the file containing the designated page received from the service providing server 12 and executes printing based on the acquired file (S105).

Figure 7:
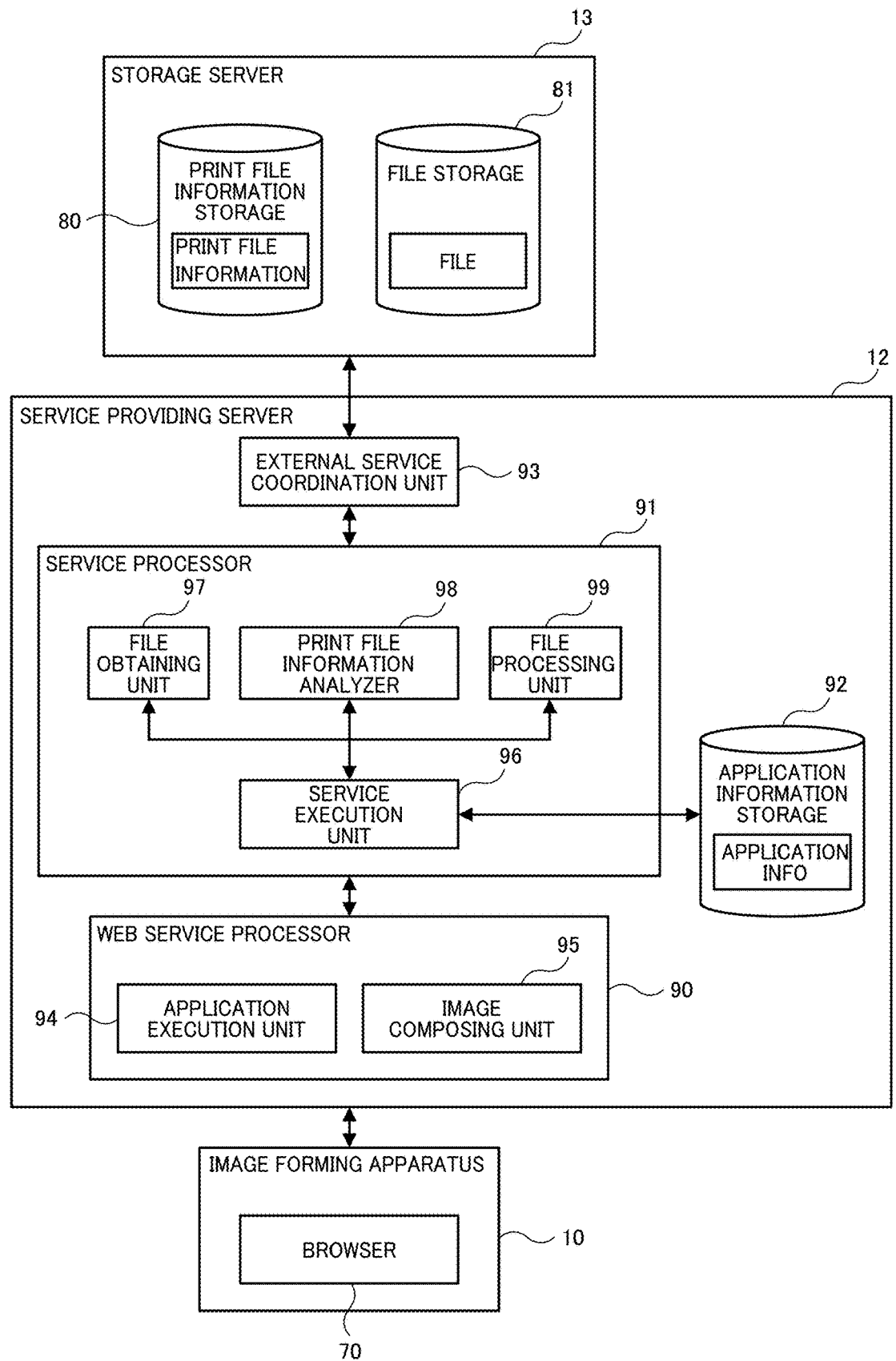
FIG. 7 is a schematic block diagram illustrating an example of a functional configuration of the service providing server in the information processing system of FIG. 6, according to an exemplary embodiment.

FIG. 7 is a block diagram illustrating a first example of a functional configuration of the service providing server 12 for implementing the above-described processing. Each function of the service providing server 12 may be implemented by processing circuitry such as the CPU 50. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions. FIG. 7 also illustrates a functional configuration of the image forming apparatus 10 and the external storage server 13 in addition to the service providing server 12.

The image forming apparatus 10 prints an image based on contents of a file. The image forming apparatus 10 is installed with various applications such as a browser 70. The browser 70 downloads and executes a Web service processor 90 from the service providing server 12. The external storage server 13 includes a print file information storage 80 that stores a plurality of items of print file information and a file storage 81 that stores a plurality of files that may be selected for printing.

The service providing server 12 includes the Web service processor 90, a service processor 91, an application information storage 92, and an external service coordination unit 93. The Web service processor 90 includes an application execution unit 94 and an image composing unit 95. The service processor 91 includes a service execution unit 96, a file obtaining unit 97, a print file information analyzer 98, and a file processing unit 99.

The Web service processor 90 is a set of instructions, which is to be downloaded by the browser 70 in the form of JAVASCRIPT or CSS, for execution by the CPU 30 of the image forming apparatus 10. The application execution unit 94 executes the application to, for example, request the service execution unit 96 to acquire a list of print file information to be displayed to the user, and requests the image composing unit 95 to display the list of print file information. The application execution unit 94 requests the service execution unit 96 to execute processing of particular print file information selected by the user, and requests the image forming apparatus 10 to print an image based on the processed file.

The image composing unit 95 executes display of a screen related to application. The image composing unit 95 displays a list of print file information to allow the user to select particular print file information.

The service processor 91 executes processing related to services provided by the service providing server 12. The service execution unit 96 executes various services using the file obtaining unit 97, the print file information analyzer 98, and the file processing unit 99. In response to reception of a request for acquiring a list of print file information from the application execution unit 94, the service execution unit 96 requests the file obtaining unit 97 to acquire the list of print file information and transmits the acquired list to the application execution unit 94. In case the print file information includes time-related information such as date and time, the service execution unit 96 requests the print file information analyzer 98 to analyze the print file information that is acquired, and transmits only the print file information corresponding to the current date and time.

The print file information analyzer 98 analyzes the contents of the print file information, acquires information on a file and a page subjected to printing, and sends the acquired information on the file and the page subjected to printing to the file obtaining unit 97. The file obtaining unit 97 acquires the list of print file information, the print file information, and the file. Specifically, the file obtaining unit 97 acquires the file based on the information on the file and the page subjected to printing, acquired by the print file information analyzer 98. In case the list of print file information, the print file information, and the file are stored in the external storage server 13, the file obtaining unit 97 obtains the list of print file information, the print file information, and the file via the external service coordination unit 93. In case the list of print file information, the print file information, and the file are stored in the service providing server 12, the file obtaining unit 97 obtains the list of print file information, the print file information, and the file, directly from a storage area of the service providing server 12 such as a print file information storage that stores the list of print file information or the print file information and a file storage that stores the file.

The file processing unit 99 applies specific processing to the file acquired by the file obtaining unit 97. Examples of processing include processing to extract only a page designated by the user.

Figure 8:
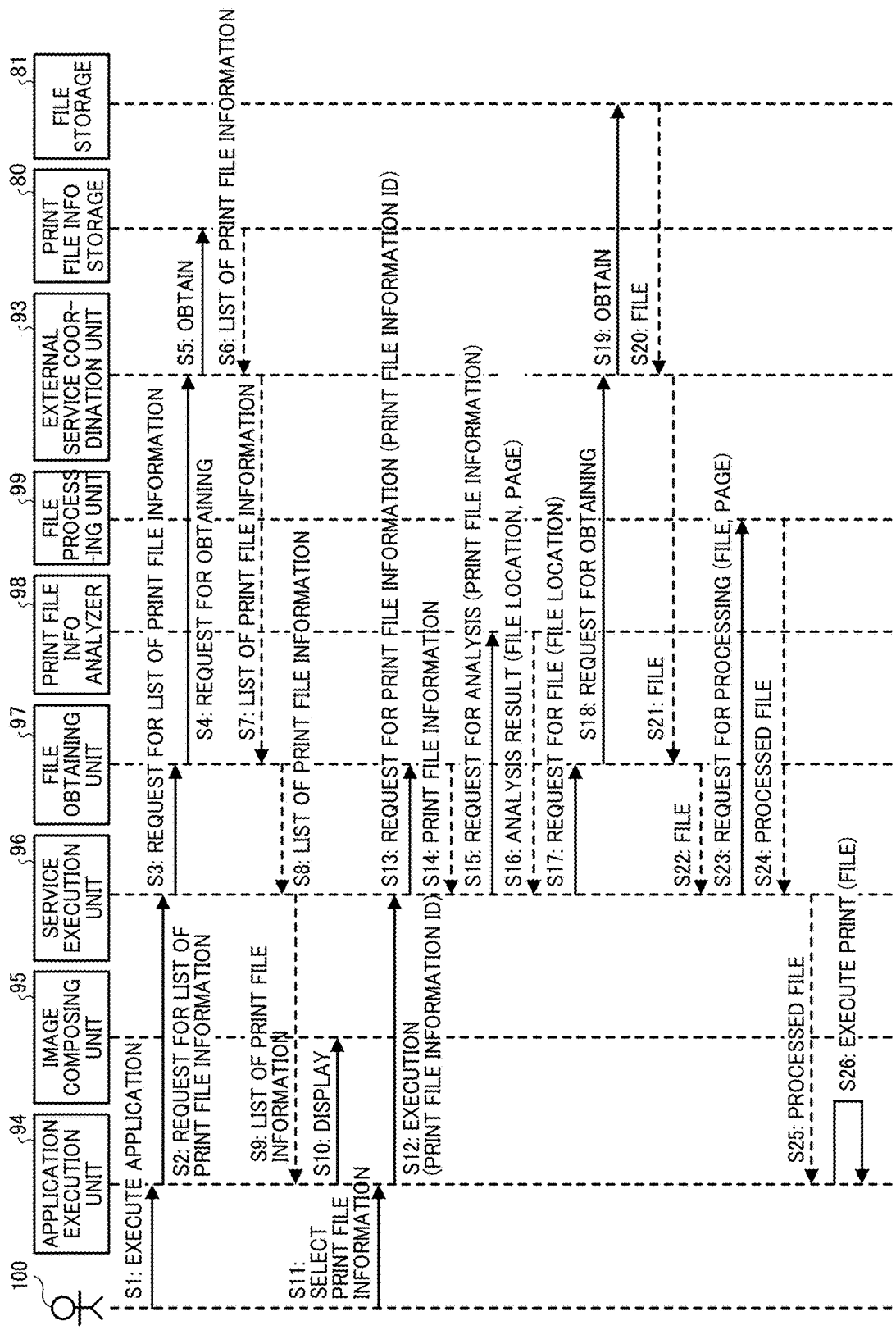
FIG. 8 is a sequence diagram illustrating overall processing executed by the information processing system, according to an exemplary embodiment.

FIG. 8 is a sequence diagram illustrating overall processing executed by the information processing system of FIG. 7, according to an exemplary embodiment. The user 100 instructs the image forming apparatus 10 to execute an application installed in the image forming apparatus 10 (51). The application execution unit 94 requests the service execution unit 96 to acquire a list of print file information (S2). The service execution unit 96 receives the request from the application execution unit 94 and requests the file obtaining unit 97 to acquire the list of print file information (S3). The file obtaining unit 97 requests the external service coordination unit 93 to acquire the list of print file information (S4). The external service coordination unit 93 acquires the list of print file information from the print file information storage 80 (S5, S6).

FIGS. 9 and 10 illustrate example data structures of a list of print file information. The data illustrated in FIG. 9 includes two items of print file information. entryID is a print file information ID for identifying print file information. entryName is a name of the print file information to be displayed. entryName does not have to be a file name of the file to be printed, and any other information may be used as long as the print file information in the print file information list can be identified. For example, a title included in the print file information may be used as entryName. In the following, the print file information is identified using a title representing a course name, based on assumption that electronic files related to courses at college, etc., are used. FIG. 9 illustrates an example case in which two items of print file information are listed for the same course. FIG. 10 illustrates an example case in which one item of print file information is listed for one course.

Referring back to FIG. 8, the external service coordination unit 93 transmits the acquired list of print file information to the file obtaining unit 97 (S7). The file obtaining unit 97 transmits the list of print file information to the service execution unit 96 (S8). The service execution unit 96 transmits the list of print file information to the application execution unit 94 (S9). The application execution unit 94 transmits the acquired list of print file information to the image composing unit 95 and instructs the image composing unit 95 to display the list of print file information (S10).

Figure 11:
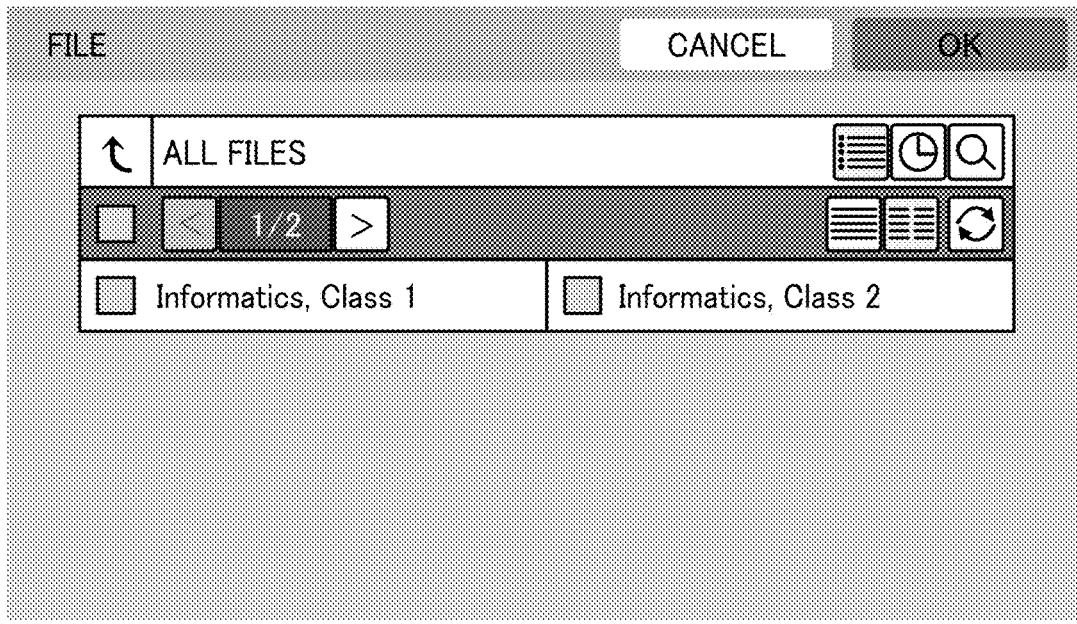
FIG. 11 is an illustration of an example file selection screen, according to the exemplary embodiment.
Figure 12:
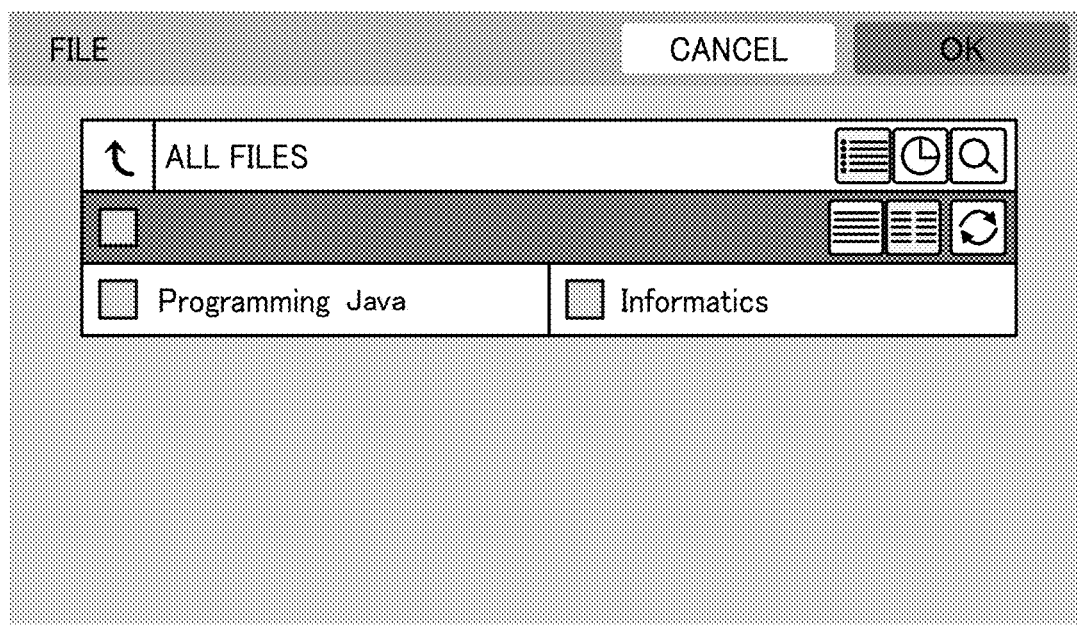
FIG. 12 is an illustration of another example file selection screen, according to the exemplary embodiment.

FIGS. 11 and 12 are diagrams each illustrating an example of a file selection screen, which includes a print file information list, displayed on the display panel 23a. Unlike the file selection screen illustrated in FIG. 4, the file selection screen of each of FIGS. 11 and 12 is a screen that allows selection of print file information. FIG. 11 illustrates an example screen displaying contents based on the print file information list of FIG. 9. FIG. 12 illustrates an example screen displaying contents based on the print file information list of FIG. 10.

Referring back to FIG. 8, the user 100 refers to the displayed print file information list of FIG. 11 and selects particular print file information subjected to printing (S11). The application executing unit 94 transmits a print file information ID for identifying the selected print file information, as information subject to printing, to the service executing unit 96 (S12). The service execution unit 96 transmits the print file information ID to the file obtaining unit 97 to request acquisition of the selected print file information identified with the print file information ID (S13).

The file obtaining unit 97 may obtain print file information at the time of obtaining a list of the print file information, or may obtain the selected print file information in response to the request for obtaining the selected print file information. In this example, it is assumed that the print file information is acquired at the time when the list of print file information is acquired. Based on the print file information ID, the file obtaining unit 97 transmits the selected print file information associated with the acquired print file information ID to the service execution unit 96 (S14).

The service execution unit 96 requests the print file information analyzer 98 to analyze the print file information that is obtained (S15).

FIGS. 13 and 14 illustrate examples of contents of the print file information. The print file information of FIG. 13 includes a URL (Uniform Resource Locator) and a path as information indicating a storage location of a particular file to be printed, and information on a page to be printed. Further, time period information may be included in the print file information. With the time period information, it is not necessary to select a particular class out of many classes in the same course. That is, the user can instruct printing of a file subjected to a particular class only by selecting a particular course with information on a time period during when a desired class took place.

The print file information of FIG. 14 includes a title and a time period in addition to the URL and the path, and the page information (information on the page to be printed). When the title is included, the title may be displayed instead of the file name to indicate a specific electronic file subject to printing. The time period is a time period during when printing of the file is allowed. In the example illustrated in FIG. 14, contents (designated pages) of two files can be printed in the period from May 1, 2019 to May 7, 2019. Contents (designated pages) of one file can be printed in the period from May 8, 2019 to May 14, 2019.

Referring back to FIG. 8, the print file information analyzer 98 analyzes the print file information to acquire the URL and path (or ID) of the file to be printed, and page information on a page of the file to be printed, and transmits the acquired information to the service execution unit 96 (S16). The service execution unit 96 notifies the file obtaining unit 97 of the URL and the path of the file to be printed, received from the print file information analyzer 98, and requests the file obtaining unit 97 to acquire the file to be printed (S17).

The file obtaining unit 97 notifies the external service coordination unit 93 of the URL and path of the file to be printed, acquired from the service execution unit 96 (S18). The external service coordination unit 93 acquires the file to be printed from the file storage 81 using the notified URL and path (S19, S20). The external service coordination unit 93 transmits the acquired file to the file obtaining unit 97 (S21). The file obtaining unit 97 transmits the acquired file to the service execution unit 96 (S22).

The service execution unit 96 transmits the acquired file and the page information to the file processing unit 99 to request processing of the acquired file according to the page information (S23). The file processing unit 99 extracts only designated page to be printed from all pages contained in the file, and generates an electronic file containing only the extracted page. In addition to the page information, the file processing unit 99 may refer to an effective time period during when printing is allowed, to extract only data having a date and time that falls within the effective time period. For example, referring to FIG. 14, if the current date is May 8, 2019, the file processing unit 99 only extracts the electronic file having the time period from May 8, 2019 to May 14, 2019 to generate a processed electronic file including data of pages 6 to 20.

The file processing unit 99 transmits the generated file, as the processed file, to the service execution unit 96 (S24). The service execution unit 96 transmits the processed file to the application execution unit 94 (S25). The application execution unit 94 requests the image forming apparatus 10 to print the processed file (S26). The image forming apparatus prints contents of the processed file to output a printed image. Accordingly, the user can receive the printed image of the page of the file, according to the selected print file information.

In the above examples, since one item of print file information includes information on one course as illustrated in FIGS. 13 and 14, a list of a plurality of items of print file information is acquired and displayed on the screen, such that a plurality of items of print file information on a plurality of courses is displayed, as illustrated in FIG. 12. Each file information may be assigned with a file information ID (entryID), and displayed in the form of a course name (entryName) in this example. With selection of particular print file information, the corresponding file information ID is transmitted to the service providing server 12. The course name that represents print file information may be referred to as display information.

Alternatively, one item of print file information may include information on a plurality of courses.

FIG. 15 is a diagram illustrating an example case in which information on a plurality of courses are included in one item of print file information. Instead of providing each print file information for each course, the print file information of FIG. 15 includes information on a plurality of courses. When the title is included, the title may be displayed instead of the file name to indicate a specific electronic file. Id is identification information used for identifying a particular printing condition in the print file information. Information on the printing condition includes, for example, the period, location, and page. The period is a time period during when printing is allowed. The location is a storage location, such as a URL and a path, of a file to be printed. The page is a page to be printed.

In a case where one item of print file information includes information on a plurality of courses, at S3 of FIG. 8, the service execution unit 96 requests acquisition of print file information instead of requesting acquisition of a print file information list. The service execution unit 96 does not transmit the acquired print file information to the application execution unit 94 as it is, but causes the print file information analyzer 98 to analyze the print file information to make a set of Id and course name for each printing condition, and transmits a list of a plurality of items of print set information as a print file information list.

FIG. 16 is a diagram illustrating an example data structure of a print file information list (print set information list) in a case where one item of print file information includes information on a plurality of courses. Since each course name is associated with a corresponding Id, information for identifying print file information such as entryID is not needed. That is, since there is only one item of print file information for one application, as long as the Id indicating a particular portion in the print file information is included, entryID for identifying particular print file information is not needed.

In the processing of FIG. 8, the print file information is acquired using the print file information ID for identifying particular print file information. In this case of selecting particular print file information from the print file information list (print set information list) illustrated in FIG. 16, the print file information is acquired using the Id. The print file information analyzer 98 analyzes a part of the print file information specified by a particular Id, and returns information on a file, such as the URL and the path of the file, a page to be printed, etc., as the analysis result.

In the above-described examples, the user selects print file information and instructs printing according to the selected print file information. In order to execute the processing, print file information has been registered beforehand.

FIG. 17 is a schematic diagram illustrating a concept of processing, from registration of print file information to printing of particular file by a user, according to exemplary embodiments. In this example, it is assumed that a teacher registers an electronic file for a particular course at a school, etc., and a student prints a part of file of the particular course (such as a part related to a particular class in the course). The service providing server 12 is previously set with an organization ID (tenantId) of a school, and an account created for a teacher and students under the tenantId. In this example, the image forming apparatus 10 is associated with the tenantId of the school. TenantId is one example of tenant information identifying a tenant (such as an organization like a school).

The service providing server 12 stores authentication information for identifying a group to which a plurality of users (students) who will request to print belongs, such as tenantId. Each tenantId is assigned to each school in this example, but tenantID may be assigned in various other ways depending on a specific application. For example, each tenantID may be assigned to each grade, class of students, each department, or a group of students taking the same course, etc. In a case where a student takes a plurality of courses at college, etc., if authentication information (login information) differs for each course, the student has to log in for each course and select print file information. In view of this, a plurality of sub-tenant IDs may be used under one tenantId. In such case, a sub-tenant ID may be assigned to a particular course.

The teacher logs into the service providing server 12 using the terminal 11, and configures various settings for each course such as registering a specific textbook for each course (S201). At this time, the teacher inputs various settings such as an electronic file, a title of the electronic file, and pages to be printed by the student as the printing condition. The teacher may additionally set monochrome printing or color printing, or duplex printing or single-side printing, as the printing condition. The teacher may further set a time period during when printing of the electronic file is allowed.

The service providing server 12 generates print file information including various settings (such as information on the file or page to be printed) (S202). The generated print file information may be stored in the external storage server 13 or may be stored in a storage area of the service providing server 12. The print file information may include information on one course, or may include information on a plurality of courses.

The service providing server 12 sends a notification to each student indicating addition of settings information (print file information) by e-mail or SNS (Social Network Service) (S203). Accordingly, the teacher does not have to send any notification to each student, thus reducing workload of the teacher. The teacher may previously register the content of a message to be notified at the time of registering settings information. As a notification destination, accounts each having been selected by the teacher at the time of registering settings information, or all accounts of students belonging to tenantId, may be used. If information on students is previously registered as authentication information, for example, accounts of students belonging to a particular department or a particular class may be selected as a notification destination.

The student who has received the notification logs into the service providing server 12 from the image forming apparatus 10 associated with the tenantId, selects the print file information, and instructs printing (S204). When one item of print file information is associated with a set of materials used in one course, the image forming apparatus 10 acquires a print file information list associated with tenantId from the service providing server 12. When one item of print file information is associated with a plurality of sets of materials respectively used in a plurality of courses, the image forming apparatus 10 acquires and analyzes each item of print file information and displays such as a button corresponding to each set of materials for each course.

Figure 18:
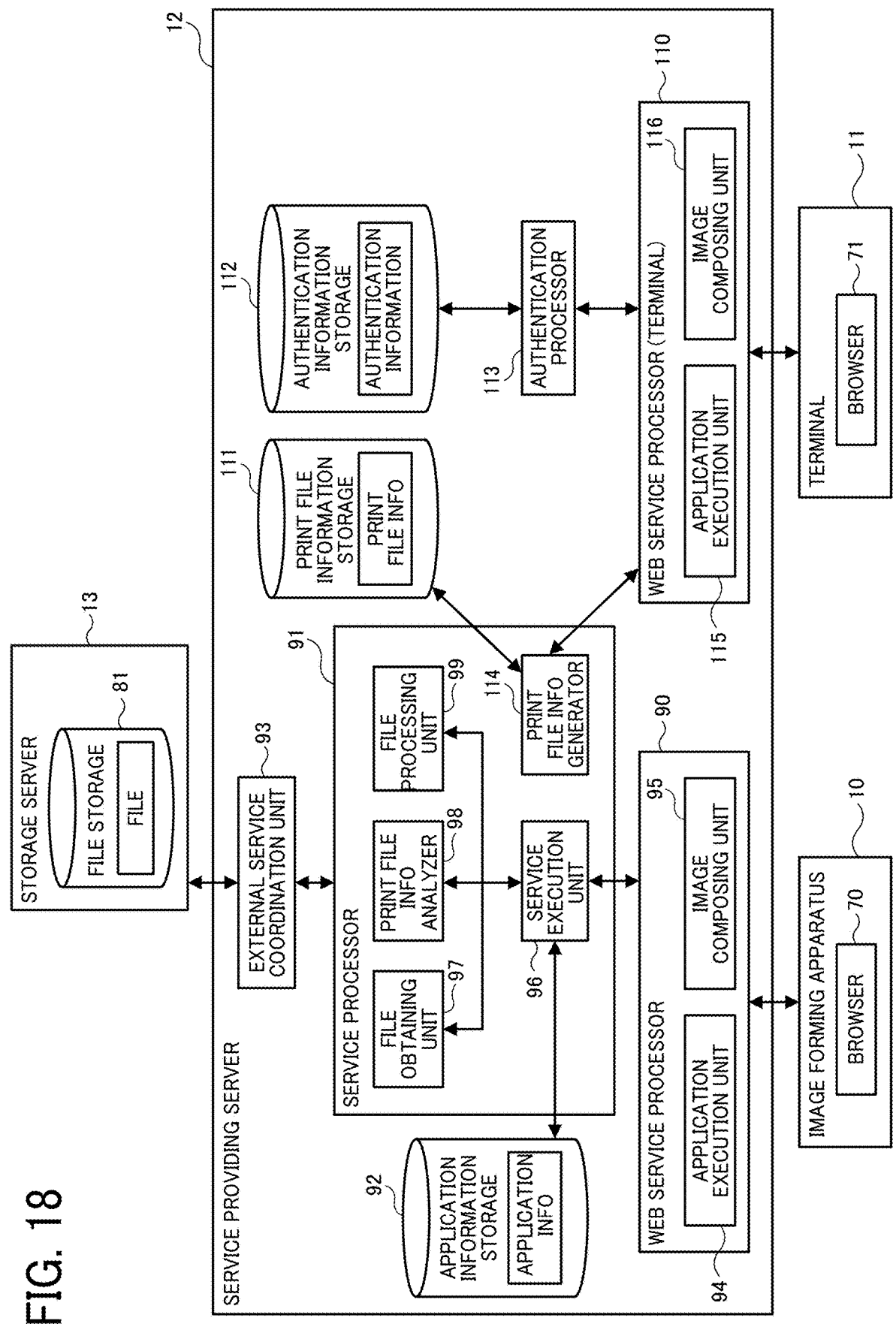
FIG. 18 is a schematic block diagram illustrating another example of a functional configuration of the service providing server in the information processing system of FIG. 17, according to an exemplary embodiment.

FIG. 18 is a block diagram illustrating a second example of a functional configuration of the service providing server 12. The service providing server 12 includes a Web service processor 90, a service processor 91, an application information storage 92, and an external service coordination unit 93, which are substantially the same functional units as illustrated in FIG. 7. The service providing server 12 further includes a Web service processor 110, a print file information storage 111, an authentication information storage 112, and an authentication processor 113. The service processor 91 further includes a print file information generator 114, compared to the service processor 91 of FIG. 7. The print file information storage 111 may be provided not only at the service providing server 12 but also at the external storage server 13. In the following, only portions different from the configuration illustrated in FIG. 7 will be described.

The Web service processor 110 is a set of instructions, which is to be downloaded by the browser 71 in the form of JAVASCRIPT or CSS, for execution by a CPU of the terminal 11. The Web service processor 110 includes an application execution unit 115 and an image composing unit 116. The application execution unit 115 executes an application for registering and setting print file information. The application execution unit 115 requests the print file information generator 114 to generate print file information in response to reception of a user input. The image composing unit 116 executes display of a screen related to application. For example, the image composing unit 116 displays a plurality of parameters to the user, and receives a user input regarding the plurality of parameters.

Figure 19:
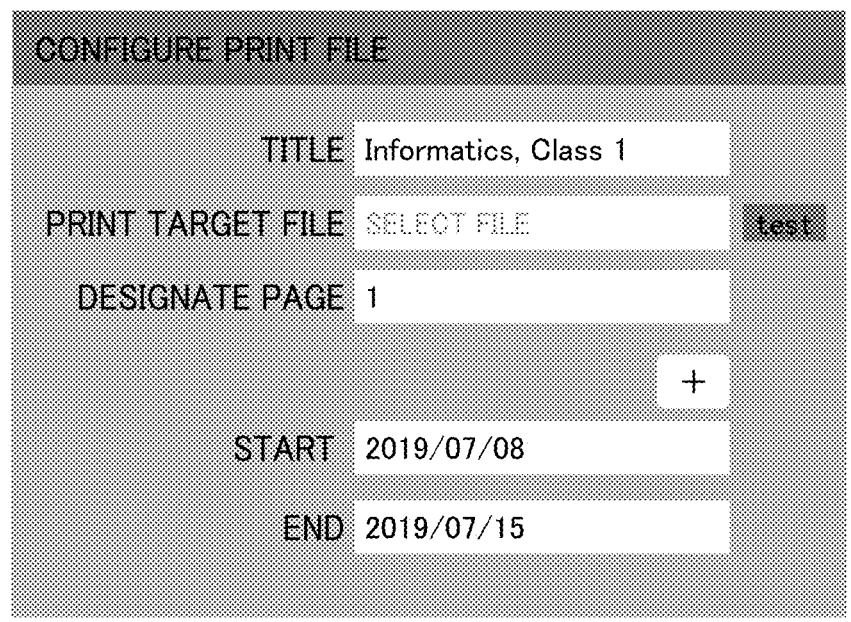
FIG. 19 is an illustration of an example setting screen.

FIG. 19 illustrates an example screen displayed by the image composing unit 116. The title is input with a label, which is to be displayed when printing is executed according to an instruction from the user (student). The print target file is input with a file to be printed, which may be selected. The start date and the end date indicate a start date and an end date of the effective time period, during when the print target file can be printed.

Authentication has been performed between the service providing server 12 and the external storage server 13 that stores one or more files. The service providing server 12 provides a print file setting screen only to an authenticated user. The service providing server 12 is able to register a plurality of files. When registering the plurality of files, the service providing server 12 stores various items that are set via the screen of FIG. 19 for each of the plurality of plurality of files. In addition to the items such as the title displayed in FIG. 19, the print file setting screen of FIG. 19 may include other items such as color, duplex printing, aggregate printing, etc.

After setting the items, the service providing server 12 may notify the user who will instruct printing by e-mail or the like. However, in a case where the registered date is before start of the effective time period, the service providing server 12 may notify the user at the start date of the effective time period. Since a notification is sent on the date when printing is made effective, the user can instruct printing as soon as the user receives the notification, thus improving convenience for the user. In a case where data on courses has already been provided to the service providing server 12 or has already been associated with a server in the school, a notification destination may be set only by selecting a particular course or class, or the start date and the end date may be automatically input only by selecting the class schedule of a particular course.

Referring back to FIG. 18, the authentication information storage 112 stores authentication information to be verified with login information input by the user when the user logs into the system. The authentication information is an account or the like of the user. The authentication processor 113 acquires, verifies, or updates the authentication information stored in the authentication information storage 112.

The print file information generator 114 receives information set by the user such as a file to be printed, a page to be printed, and an effective time period for printing, and generates print file information using such information. The print file information generator 114 stores the generated print file information in the print file information storage 111. FIG. 20 is a sequence diagram illustrating processing to register print file information, according to an exemplary embodiment. When the user (teacher) 120 accesses application from the terminal 11 (S31), the application execution unit 94 requests the image composing unit 95 to display an authentication screen (S32).

The user 120 logs into the service providing server 12 with the user's account (S33). The application execution unit 94 sends the login information received from the user 120 to the authentication processor 113 and requests the authentication processor 113 to execute authentication (S34). The authentication processor 113 executes authentication processing and notifies the application execution unit 94 of an authentication result (S35). When the authentication result indicates successful authentication, the application execution unit 94 instructs the image composing unit 95 to display a setting screen, such as the print file setting screen of FIG. 19 (S36).

The user 120 inputs a page to be printed, an effective time period, and the like, to set various information on a print target file, via the displayed setting screen (S37). In this example, to select the print target file, the particular print target file is selected from a plurality of files stored in the external storage server 13. The external storage server 13 to be used is set in advance to be linked to a particular account. Therefore, the external storage server 13 can be accessed using login information input by the user 120, and the print target file can be acquired from the external storage server 13. The application execution unit 94 requests the authentication processor 113 to acquire the external authentication information (S38), and acquires the external authentication information from the authentication processor 113 (S39). In this example, the authentication information is the authentication information of the logged-in user 120, and the external authentication information is the authentication information of the user (student) 100. The application execution unit 94 requests the external service coordination unit 93 to acquire a list of folders stored in the external storage server 13 using the acquired external authentication information (S40). The folder list is a list of folders including files stored in the external storage server 13.

The external service coordination unit 93 acquires the folder list from the file storage 81 using the external authentication information (S41, S42). The external service coordination unit 93 transmits the acquired folder list to the application execution unit 94 (S43). The application execution unit 94 instructs the image composing unit 95 to display the acquired folder list (S44). Although the external service coordination unit 93 is used in this example, the external service coordination unit 93 does not have to be used. If the external service coordination unit 93 is not used, the service providing server 12 may select a file stored in the external storage server 13, by accessing the external storage server 13 upon selection and successful authentication. Alternatively, the service providing server 12 may select a local file.

The user 120 refers to the displayed folder list to select a print target file (S45), and sets a page to be printed (S46) and an effective time period (S47) for the print target file. If the print file information is to be hierarchically displayed for selection, the user 120 sets a hierarchical structure at this time. After setting various items, the user 120 requests registration of settings (S48). In response to the registration request, the application execution unit 94 transmits the settings information and the authentication information to the print file information generator 114, and instructs the print file information generator 114 to generate print file information (S49). The print file information generator 114 generates print file information using the settings information and the authentication information, and stores the generated print file information in the print file information storage 111 (S50).

The print file information generator 114 generates print set information from the settings information, assigns an ID to the print set information, and generates print file information using tenant information included in the authentication information. The print set information is information on each file, with a plurality of files being grouped into one set. If there is one item of print file information for particular tenant information, the print set information is added to one item of print file information. If there is more than one item of print file information for particular tenant information, print file information including print set information is newly generated. By adding the tenant information and the ID of the print set information to the print file information, the print file information to be used for executing printing can be distinguished from each other.

In a case where the print file information is stored in the external storage server 13, even when the tenant information is attached to the print file information, the tenant information cannot be obtained unless the file is acquired. Therefore, by including an ID for identifying the print file information in the application information associated with the same tenant information, the print file information is acquired at the time of printing.

Figure 21B:
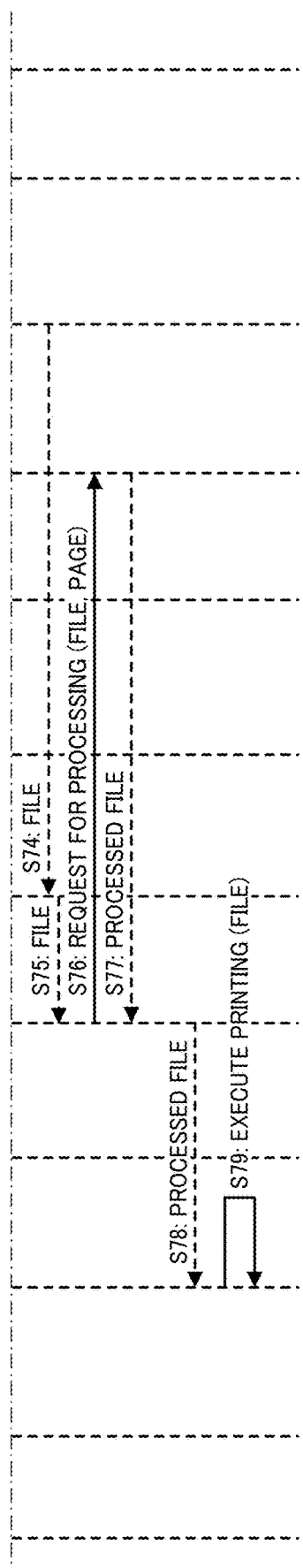

FIGS. 21A and 21B (FIG. 21) are a sequence diagram illustrating processing to execute printing according to an exemplary embodiment. The image forming apparatus 10 is associated with tenant information of a user who has already registered a file. The user 100 (student) instructs the service providing server 12 to activate application to execute processing (S51). The application execution unit 94 transmits the tenant information associated with the image forming apparatus 10 to the application information storage 92, and acquires the application information (S52). The application information storage 92 returns application information corresponding to the tenant information (S53).

In accordance with the acquired application information, the application execution unit 94 instructs the service execution unit 96 to acquire a list of print set information (S54). When the print file information is stored in the external storage server 13, the application execution unit 94 sends the ID of the print file information included in the application information. The service execution unit 96 then acquires the print file information using the notified ID. When the service providing server 12 is provided with the print file information storage 111, the service execution unit 96 acquires the print file information having the same tenant information from the print file information storage 111 (S55 and S56).

The print file information analyzer 98 analyzes the acquired print file information and returns a result of analysis to the service execution unit 96 (S57 and S58). The service execution unit 96 extracts print set information and generates a list of print set information to be selected at the image forming apparatus 10 (S59). The print set information list does not include all data items of print set information. The list of print set information includes a name to be displayed and ID for each print set information in the list. When the effective time period is included in the print set information, the service extraction unit 96 generates a list of print set information only having an effective time period in which the current date and time falls within.

The print set information list may have a hierarchical structure. In the case of the hierarchical structure, the print set information list may include hierarchical information. In the case of the hierarchical structure, a department name or the like is preferable, which may be acquired from such as the authentication information. The application execution unit 94 receives the print set information list (S60) and instructs the image composing unit 95 to display the print set information list (S61).

Figure 22:
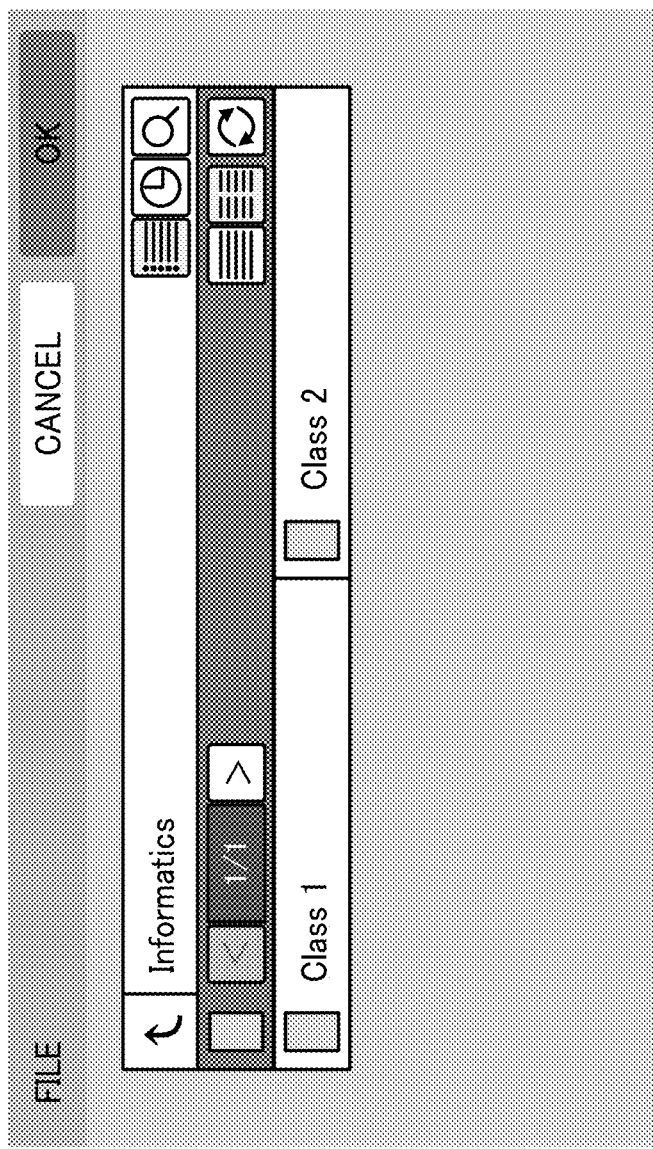
FIG. 22 is an illustration of an example screen in which a plurality of items of print set information is hierarchically displayed.

FIG. 22 is a diagram illustrating an example screen in which a plurality of items of print set information is hierarchically displayed. When a plurality of courses is displayed as a list, the student, who takes a plurality of courses, has to select the plurality of courses one by one and further select a particular class for each course, thus making processing complicated. In view of this, a course name set by the teacher at the time of registration is associated with the print file information and the print set information, such that the print set information is displayed in hierarchical structure, thus allowing the user to easily select the print file information.

In order to display in the hierarchical structure, information on the hierarchical structure of an organization to which the user (student) belongs is previously registered in any storage area. For example, in addition to a name of the department offering the course, information on a teacher who is in charge of the course, information on a subject taught in the course, etc., are registered as information used to form the hierarchical structure.

FIG. 23 is a diagram illustrating an example of print file information displayed in a hierarchical structure. The print file information can be displayed in hierarchical structure, by including hierarchical information of each folder in the path field. In this example, department name/course name are entered in the path, but any other information may be entered in the path such as teacher name/course name.

FIG. 24 is a diagram illustrating another example of print file information displayed in a hierarchical structure. In this example, a title and an ID of a teacher (TeacherId) are added. Authentication information of the teacher is acquired based on the ID of the teacher, to display information such as a name and a department in charge of the teacher. For example, Informatics course is taught by a teacher having an ID of A, and Analytics course is taught by a teacher having an ID of B.

Referring back to FIG. 21, the user 100 selects particular print set information for printing, from among the print set information displayed on the screen (S62). The application execution unit 94 sends the ID of the selected print set information and the tenant information to the service execution unit 96 (S63), and the service execution unit 96 executes processing. The service execution unit 96 acquires print file information that matches the tenant information from the print file information storage 111 (S64, S65). The service execution unit 96 sends the acquired print file information to the print file information analyzer 98, and requests the print file information analyzer 98 to analyze the print file information (S66). The print file information analyzer 98 returns the analysis result to the service execution unit 96 (S67).

The service execution unit 96 extracts the print set information selected by the user, from the analysis result, and requests the file obtaining unit 97 to acquire the print target file based on the extracted print set information (S68). When the print target file is stored in the external storage server 13, the service execution unit 96 acquires external authentication information from the authentication processor 113 (S69 and S70), and requests the external service coordination unit 93 to acquire the print target file (S71). The external service coordination unit 93 accesses the file storage 81 of the external storage server 13 and acquires the print target file (S72, S73). The external service coordination unit 93 transmits the acquired print target file to the file obtaining unit 97 (S74). The file obtaining unit 97 transmits the print target file to the service execution unit 96 (S75).

The service execution unit 96 sends the acquired print target file together with the page information to the file processing unit 99, and requests processing of the file (S76). The file processing unit 99 processes the file into a file that only contains the page to be printed, based on the page information, and sends the processed file to the service execution unit 96 (S77). The service execution unit 96 transmits the processed file to the application execution unit 94 (S78). The application execution unit 96 executes printing using the processed file (S79).

In case where the effective time period for printing is set, only the print set information having a date and time that is within the effective time period is displayed. In such case, the print set information having a date and time that is outside the effective time period may be displayed on a different tab. When the end of the effective time period approaches, the user (teacher) 120 confirms whether or not the user (student) 100 has printed class materials, which is previously registered as a print target file. When the user (student) 100 has not printed, the user (teacher) 120 sends a notification again to remind the user (student) 100 to print class materials.

This processing to send a reminder may be automatically performed by the service providing server 12. For example, the service execution unit 96 determines whether the print file information subjected to printing has been selected for execution by any one of users to which a notification has been transmitted, until the end of the effective time period during when printing is allowed. In a case where any user who has not instructed to print exists, the service execution unit 96 transmits a notification to the user who has not instructed to print.

In any one of the above-described examples, the user (student) 100 is required to log into the system to perform printing. That is, in order for the user (teacher) 120 to check who has not performed printing to determine whether any reminder is needed, login of the user 100 (student) is necessary. In view of this, a personal identification number (PIN) code may be generated and issued by the information processing system in response to a request from the user (teacher) 120. This eliminates a need for the user (student) 100 to log into the system to check whether the user (student) 100 has printed. Further, the user (student) 100 can also display the print set information of the particular course taken by the user 100 only by inputting the PIN code without logging in, thus facilitating processing to print class materials.

FIG. 25 is a schematic diagram illustrating a concept of processing, from registration of print file information to printing of particular file by a user, according to an exemplary embodiment. The teacher logs into the service providing server 12 using the terminal 11, and configures various settings for each course such as registering a print target file and a printing condition (S301).

The service providing server 12 generates print set information in which the print target file, and the printing condition such as information on the page to be printed, are grouped together (S302). The service providing server 12 further generates a PIN code for the print set information, and associates the print file information and the PIN code with each other.

The service providing server 12 stores the print file information in a storage such as the external storage server 13, and notifies the student as the user 100 of addition of settings by e-mail or the like. At this time, the service providing server 12 also notifies the user 100 of the generated PIN code (S303). The PIN code is also notified to the image forming apparatus 10 and displayed on the screen of the display panel 23a.

The user 100 enters the PIN code, which is displayed on the display panel 23a or notified by e-mail, to request printing of material indicated by the print set information associated with the PIN code. The PIN code does not have to be transmitted in the notification. For example, as long as the teacher notifies the student of the PIN code in the class, any student who attended is able to print class materials using the PIN code, including a guest student.

Figure 26:
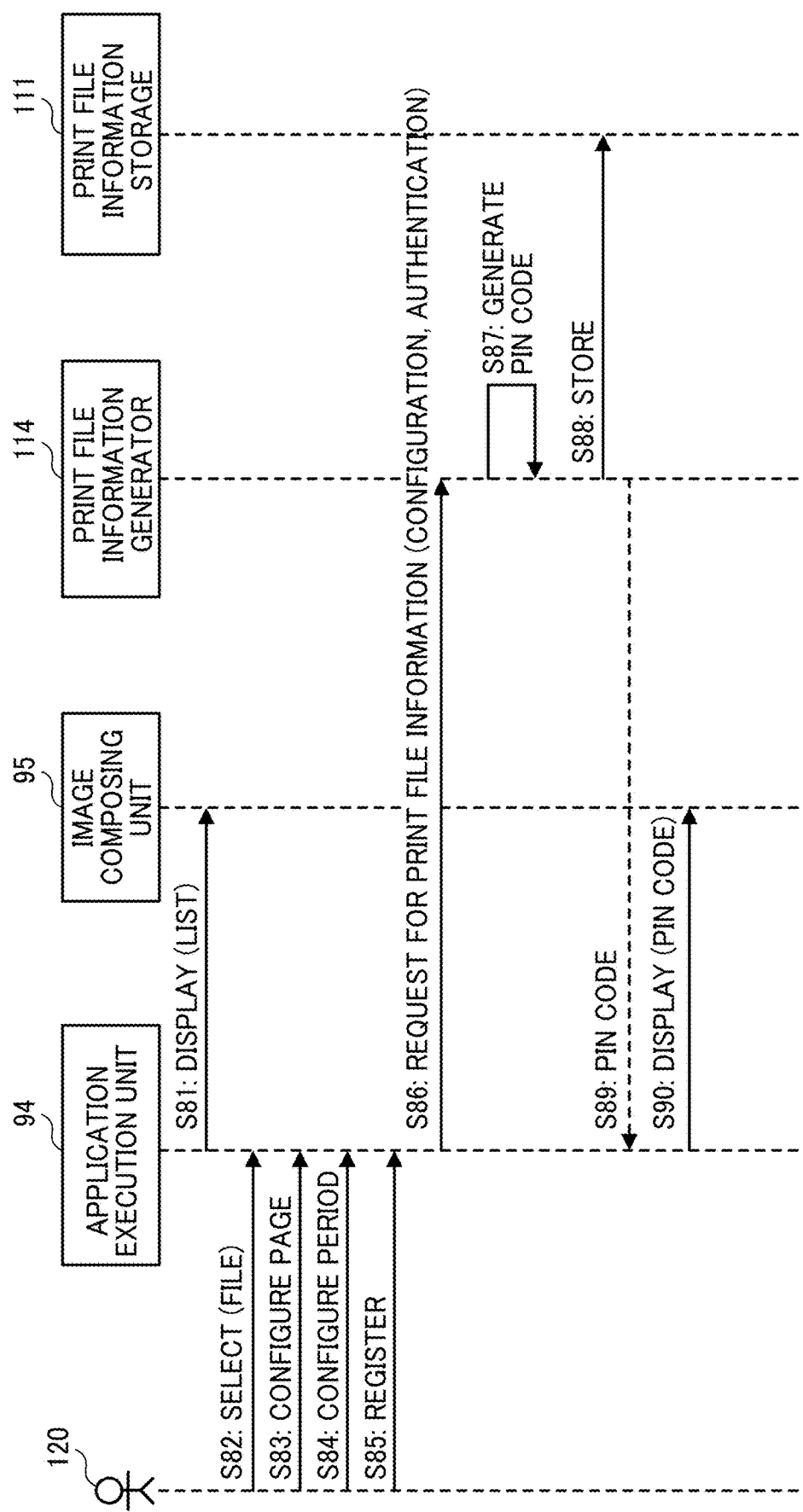
FIG. 26 is a sequence diagram illustrating processing to register print file information using a PIN code, performed by the information processing system of FIG. 25, according to the exemplary embodiment.

FIG. 26 is a sequence diagram illustrating processing to register print file information using a PIN code, performed by the information processing system of FIG. 18, according to the exemplary embodiment. Since processing from S31 to S43 are performed in a substantially similar manner, description thereof is omitted. FIG. 26 illustrates processing after S43 of FIG. 20. The application execution unit 94 instructs the image composing unit 95 to display a list of folders (S81). The user (teacher) 120 selects a print target file (S82), sets a page to be printed (S83), and sets an effective time period (S84). After setting, the user 120 requests registration of various settings (S85). In response to the registration request, the application execution unit 94 sends information on various settings and authentication information of the user 120 to the print file information generator 114 to request generation of print file information (S86).

The print file information generator 114 generates a PIN code (S87). Each PIN code is uniquely assigned to each print set information. The print file information generator 114 generates print file information using information on various settings, and stores the generated print file information in the print file information storage 111 (S88). When the print file information is stored, the print file information is stored in association with the PIN code.

The print file information generator 114 sends the generated PIN code to the application execution unit 115 (S89). The application execution unit 115 instructs the image composing unit 116 to display the received PIN code (S90). Accordingly, the user (student) 100 is able to instruct printing of the print target file, as indicated by the information on settings, using the PIN code.

In a case where each user 100 registers an e-mail address or SNS information in the service providing server 12, the PIN code may be transmitted to a student of the same tenant by using an e-mail, an SNS, or the like in addition to or in alternative to displaying the PIN code on the screen.

Figure 27:
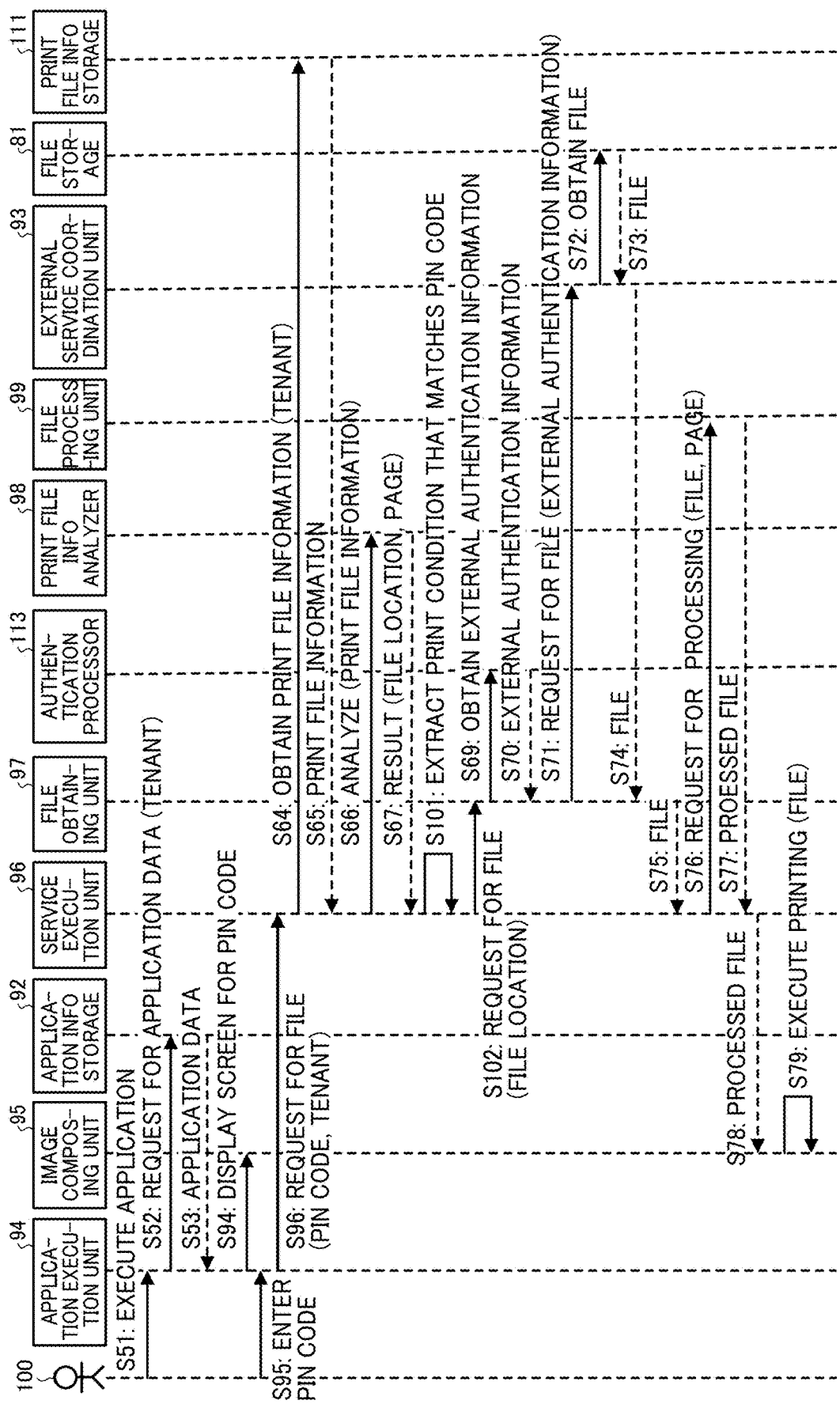
FIG. 27 is a sequence diagram illustrating processing to execute printing using a PIN code, performed by the information processing system of FIG. 25, according to an exemplary embodiment.

FIG. 27 is a sequence diagram illustrating processing to execute printing using a PIN code, performed by the information processing system of FIG. 25, according to an exemplary embodiment. For simplicity, only portions different from the processing illustrated in FIG. 21 will be described below. After acquiring the application information from the application information storage 92 upon activation (S51, S52, S53), the application execution unit 115 instructs the image composing unit 95 to display a PIN code input screen (S94). The user (student) 100 inputs a PIN code, which is notified, on the input screen (S95). As described above, when the PIN code is used, the print file information list is not acquired. Rather, the print target file is requested using the PIN code (S96) to acquire and analyze the print file information (S64 to S67).

The service execution unit 96 then extracts the printing condition (print set information) that matches the PIN code (S101). The service execution unit 96 then sends the extracted print set information and requests the file obtaining unit 97 to acquire the print target file (S102). The processing after S69 is performed in a substantially similar manner as described above referring to FIG. 21.

Figure 28:
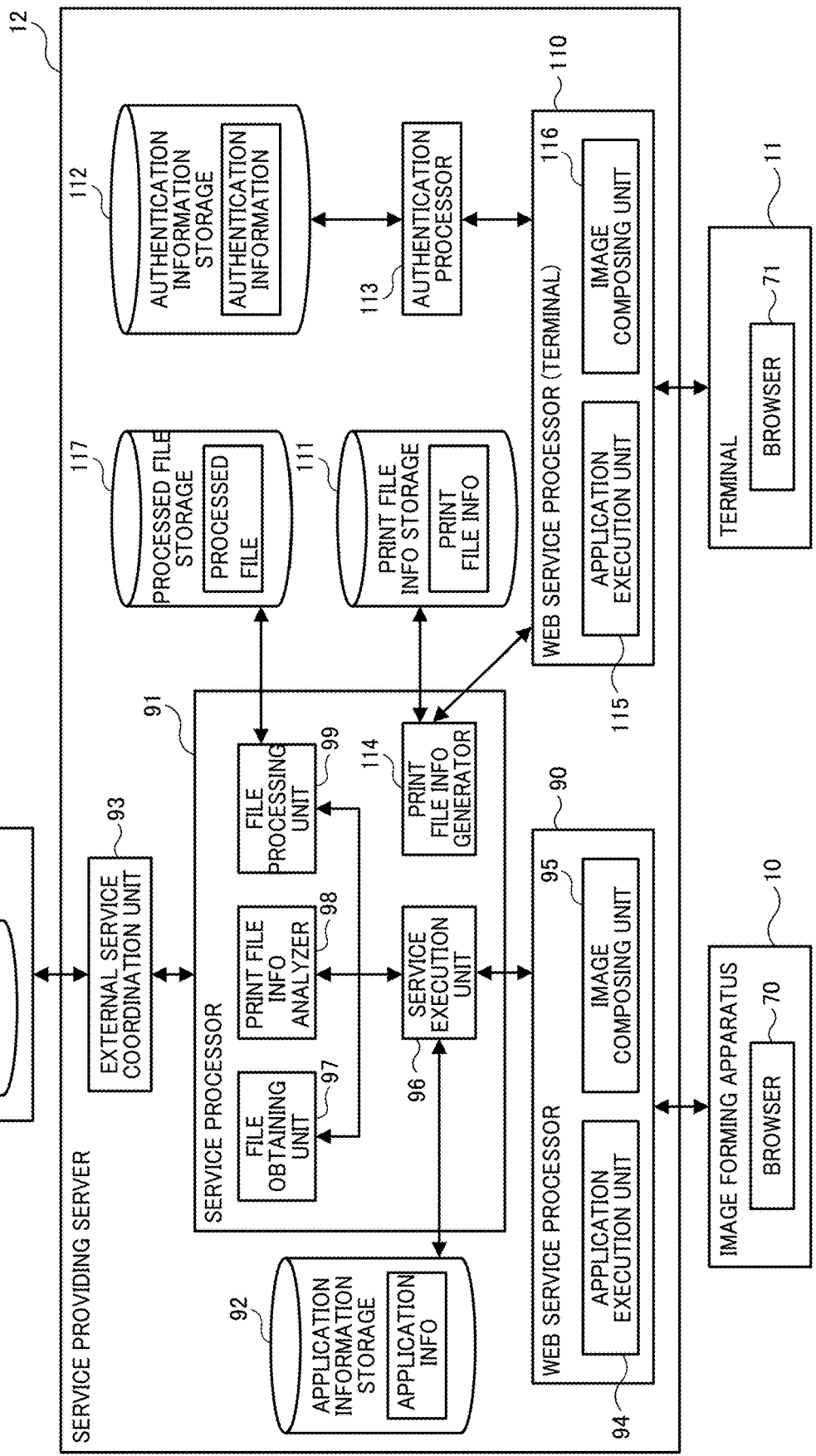
FIG. 28 is a schematic block diagram illustrating another example of a functional configuration of the service providing server in the information processing system of FIG. 25, according to an exemplary embodiment.

FIG. 28 is a block diagram illustrating a third example of a functional configuration of the service providing server 12. The service providing server 12 includes a Web service processor 90, a service processor 91, an application information storage 92, an external service coordination unit 93, a Web service processor 110, a print file information storage 111, an authentication information storage 112, and an authentication processor 113, each of which is the same as corresponding one of the functional units illustrated in FIGS. 18, and further includes a processed file storage 117. The print file information storage 111 may be provided not only at the service providing server 12 but also at the external storage server 13. In the following, only portions different from the configuration illustrated in FIG. 18 will be described.

In this example, at the time when the user 120 registers print file information, the file processing unit 99 processes the print target file and stores the processed file in the processed file storage 117. Since the processed file storage 117 stores all the processed files, a storage capacity of the service providing server 12 is used to store the processed files, such that a sufficient memory space may be needed. On the other hand, since it is not necessary to perform processing at the time of executing printing, and it is not necessary to acquire a file from the external storage server 13, a time for completing printing decreases.

FIGS. 29A and 29B (FIG. 29) are a sequence diagram illustrating processing to register print file information in this example case of processing the file in advance, performed by the information processing system of FIG. 28, according to the exemplary embodiment. Since processing from S31 to S48 of FIG. 29 are substantially similar to S31 to S48 of FIG. 20, description thereof is omitted.

After the user 120 performs registration, the application execution unit 94 requests the service execution unit 96 to generate a processed file (S129). The service execution unit 96 requests the file obtaining unit 97 to acquire a print target file (S130). The file obtaining unit 97 acquires authentication information from the authentication processor 113 (S131 and S132), and sends the authentication information to the external service coordination unit 93 to request acquisition of a file (S133). The external service coordination unit 93 acquires the file using the authentication information (S134 and S135), and sends the acquired file to the file obtaining unit 97 (S136). Then, the file obtaining unit 97 transmits the acquired file to the service execution unit 96 (S137).

The service execution unit 96 sends the acquired file, information on the page to be printed (that is, the printing condition), etc., to the file processing unit 99 (S138). The file processing unit 99 extracts only designated page to be printed from all pages contained in the file, and generates an electronic file containing only the extracted page. The file processing unit 99 stores the processed file in the processed file storage 117 (S139), assigns a processed file ID to enable later acquisition of the particular processed file, and sends the processed file ID to the service execution unit 96 (S140). When the print file information generator 114 generates the print file information, the service execution unit 96 sends the acquired processed file ID to the print file information generator 114 (S141). The print file information generator 114 stores the print file information and the processed file ID in association in the print file information storage 111 (S142).

FIG. 30 illustrates an example of contents of the print file information. The print file information includes two items of print set information, and each item of print set information includes an effective time period. In any of the above-described examples, the print file information includes "Location" indicating the storage location of the file and "Page" indicating the page to be printed. The print file information illustrated in FIG. 30 does not include those types of information. Information on the storage location and the page to be printed is not needed, as the print target file has been already processed. On the other hand, a processed file ID for identifying a processed file is added in a FileID field. FileID field is input with one or more files to be printed as a print job, and in the example illustrated in FIG. 30, two file IDs are included to represent two processed files to be printed as a set.

In the example illustrated in FIG. 30, since one item of print file information includes all items of print set information registered under the same tenant, the print set information is added to the print file information every time the user 120 performs registration from the terminal 11.

Figure 31:
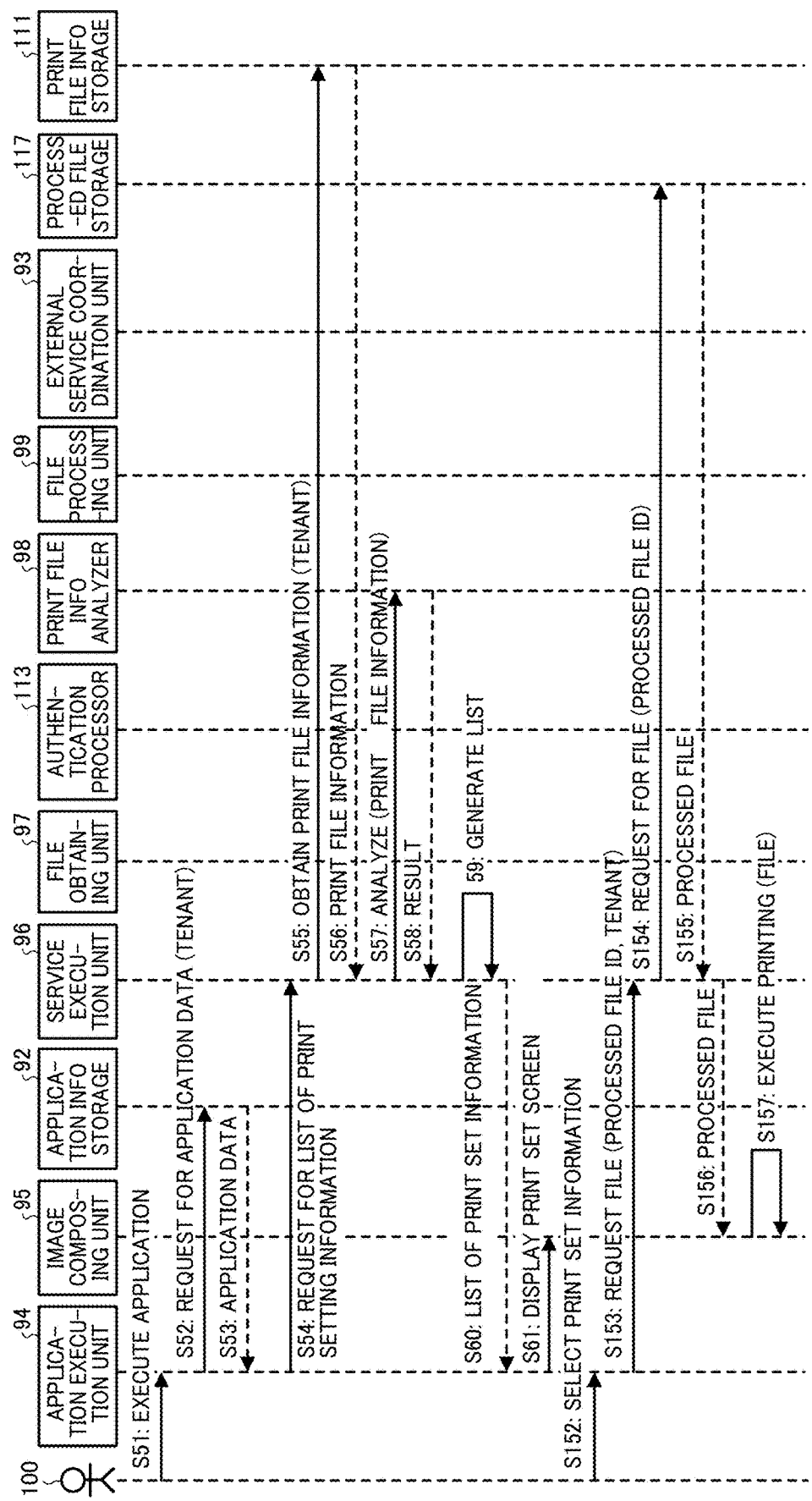
FIG. 31 is a sequence diagram illustrating processing to execute printing, in the example case of processing the file in advance, performed by the information processing system of FIG. 28, according to the exemplary embodiment.

FIG. 31 is a sequence diagram illustrating processing to execute printing, in this example case of processing the file in advance, performed by the information processing system of FIG. 28, according to the exemplary embodiment. Since processing from S51 to S61 of FIG. 31 is substantially the same as the processing from S51 to S61 in FIG. 21, description thereof will be omitted.

When the image composing unit 95 displays a screen (S151), the user 100 selects the print set information (S152). Although the ID of the print set information is transmitted to the service execution unit 96 in the processing of FIG. 21, the application execution unit 94 transmits the processed file ID (S153) in this example. The service execution unit 96 acquires the processed file from the processed file storage 117 using the processed file ID (S154, S155). The service execution unit 96 transmits the acquired processed file to the application execution unit 94 (S156). The application execution unit 94 executes printing of the processed file (S157).

As described above, according to one or more embodiments described above, information on a file to be printed, a page to be printed, and various other settings may be stored as print file information. The print file information may be selected to execute printing of the target print file according to the print file information. Thus, a user does not have to remember which page of which file to print. This is especially useful in a case where the same file is to be printed by a plurality of users under the same condition.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, in alternative to generating a processed electronic file and transmitting the processed electronic file to the image forming apparatus 10, the service providing server 12 may transmit data subjected to printing (such as data of the designated pages) to the image forming apparatus 10. In such case, generation of a processed electronic file is not necessary.

Further, while the above-described embodiments describe an example case in which data of the electronic file is output as a printed image. Alternatively, data of the electronic file may be output in various other ways, depending on a specification of output device. For example, the output device may be implemented by an information processing apparatus such as a PC, a mobile phone, a smartphone, a tablet terminal, a PDA, etc., which may be operated by a user (for example, student). In such case, data to be output may be transmitted to the output device for display to the user.

In another example, the output device may be implemented by an information processing apparatus that shares an image with a plurality of users, such as a projector and an interactive whiteboard. In such case, data to be output ay be transmitted to the output device for display to the plurality of users.

The invention claimed is:

1. A server comprising circuitry configured to:
   receive selection of particular file information from a list of file information;
   acquire a particular electronic file from a storage location indicated by the particular file information, the particular electronic file being one or more electronic files;
   extract data of one or more pages to be output from the particular electronic file according to the particular file information;
   transmit the data of one or more pages of the particular electronic file to cause an outputting of the data of one or more pages of the particular electronic file;
   store, in a memory, a plurality of items of file information, each file information including information on an electronic file to be output and information on an output condition of the electronic file to be output, the electronic file being one or more electronic files:
   generate, as the list of file information, a list of a plurality of sets of a file information identifier identifying the file information and a display information to be displayed to represent the file information; and
   transmit the list of file information.

2. The server of claim 1, wherein:
   the circuitry is further configured to generate an electronic file that contains the data of only the one or more pages to be output, as a processed electronic file, and
   transmit the processed electronic file.

3. The server of claim 2, wherein the particular file information includes time period information indicating a time period during when outputting of the particular electronic file is allowed, and
   the circuitry extracts data of the particular electronic file having a date and time that falls within the time period indicated by the time period information of the particular file information to generate the processed electronic file that contains only the data having the date and time that falls within the time period.

4. The server of claim 1, wherein the circuitry is further configured to:
   generate one item of file information including information on an electronic file to be output and information on an output condition of the electronic file to be output, the electronic file being one or more electronic files; and
   generate, as the list of file information, a list of a plurality of sets of 1) an output condition identifier identifying an output condition in the file information, and 2) display information to be displayed to represent the output condition,
   wherein the circuitry configured to transmit further transmits the list of file information, from which the output condition in the file information is selected as the particular file information.

5. The server of claim 1, wherein the circuitry is further configured to:
   in response to a request from a terminal operated by a user, generate file information based on an input from the user regarding the electronic file to be output and the output condition of the electronic file, and
   transmit a notification indicating addition of the file information to a transmission destination.

6. The server of claim 5, further comprising:
   a memory that stores authentication information for identifying a group to which a plurality of users who instructs to output the electronic file belongs,
   wherein the transmission destination is determined based on the authentication information.

7. The server of claim 6, wherein the file information includes time period information indicating a time period during when outputting of the particular electronic file is allowed, and
   the circuitry determines whether any one of the plurality of users who belongs to the group has not instructed to output the electronic file within the time period, and
   transmits another notification to any one of the plurality of users who has not instructed to output the electronic file.

8. The server of claim 6, wherein the user who operates the terminal and the plurality of users who instructs to output is different from each other.

9. The server of claim 1, further comprising:
   a memory that stores information on a hierarchical structure of an organization to which a plurality of users who instructs to output the electronic file belongs, and
   generate the list of file information so as to be displayed in the hierarchical structure.

10. An information processing system comprising:
    the server of claim 1; and
    an output device to output data of one or more pages, the output device including a display configured to display a screen including the list of file information.

11. The information processing system of claim 10,
    wherein the output device is implemented by an information forming apparatus that forms a printed image as the output data.

12. A server comprising:
    a memory that stores a plurality of processed electronic files, each processed electronic file having been generated from an electronic file to be output according to information on an output condition of the electronic file to be output; and
    circuitry configured to:
    receive selection of particular file information from a list of file information,
    acquire a particular processed electronic file from a storage location of the memory, the storage location being indicated by the particular file information,
    transmit the particular processed electronic file to cause an output of output data of the particular processed electronic file;
    store, in the memory, a plurality of items of file information, each file information including information on an electronic file to be output and information on an output condition of the electronic file to be output, the electronic file being one or more electronic files;

generate, as the list of file information, a list of a plurality of sets of a file information identifier identifying the file information and a display information to be displayed to represent the file information; and transmit the list of file information.

13. An information processing system comprising:

the server of claim 12; and an output device configured to output data of the processed electronic file, the output device including a display configured to display a screen including the list of file information.

14. The server of claim 12, wherein:

the circuitry is further configured to generate an electronic file that contains the data of only the one or more pages to be output, as a processed electronic file, and transmit the processed electronic file.

15. The server of claim 14, wherein:

the particular file information includes time period information indicating a time period during when outputting of the particular electronic file is allowed, and the circuitry extracts data of the particular electronic file having a date and time that falls within the time period indicated by the time period information of the particular file information to generate the processed electronic file that contains only the data having the date and time that falls within the time period.

16. A method for processing information, comprising:

receiving selection of particular file information from a list of file information;

acquiring a particular electronic file from a storage location indicated by the particular file information, the particular electronic file being one or more electronic files;

extracting data of one or more pages to be output from the particular electronic file according to the particular file information;

transmitting the data of one or more pages of the particular electronic file to cause the output of the data of one or more pages of the particular electronic file;

storing, in a memory, a plurality of items of file information, each file information including information on an electronic file to be output and information on an output condition of the electronic file to be output, the electronic file being one or more electronic files;

generating, as the list of file information, a list of a plurality of sets of a file information identifier identifying the file information and a display information to be displayed to represent the file information; and transmitting the list of file information.

17. The method of claim 16, further comprising:

generating an electronic file that contains the data of only the one or more pages to be output, as a processed electronic file, and transmitting the processed electronic file.

18. The method of claim 17, wherein:

the particular file information includes time period information indicating a time period during when outputting of the particular electronic file is allowed, and the method further comprises extracting data of the particular electronic file having a date and time that falls within the time period indicated by the time period information of the particular file information to generate the processed electronic file that contains only the data having the date and time that falls within the time period.

* * * * *